United States Patent
Seo et al.

(10) Patent No.: US 11,076,378 B2
(45) Date of Patent: Jul. 27, 2021

(54) METHOD FOR NOTIFICATION TO DISEMBARK AND USER EQUIPMENT

(71) Applicant: LG ELECTRONICS INC., Seoul (KR)

(72) Inventors: Yongseok Seo, Suwon-si (KR); Taeyoung Lee, Seoul (KR); Juhyoung Lee, Seoul (KR); Yong Suk Lee, Gimpo-si (KR); Jong Jin Park, Incheon (KR); Yoon Kyum Kim, Seoul (KR); Dong Woo Sohn, Gimpo-si (KR); Sung Hyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/744,008

(22) Filed: Jan. 15, 2020

(65) Prior Publication Data
US 2020/0205119 A1 Jun. 25, 2020

Related U.S. Application Data

(60) Provisional application No. 62/808,796, filed on Feb. 21, 2019.

(30) Foreign Application Priority Data

Apr. 15, 2019 (WO) ................ PCT/KR2019/004527

(51) Int. Cl.
*H04W 64/00* (2009.01)
*H04W 4/024* (2018.01)
(Continued)

(52) U.S. Cl.
CPC .......... *H04W 64/006* (2013.01); *G06Q 50/30* (2013.01); *H04W 4/024* (2018.02); *H04W 4/029* (2018.02)

(58) Field of Classification Search
CPC ..... H04W 4/029; H04W 4/40; H04W 84/005; H04W 4/44; H04W 84/18; H04W 88/08;
(Continued)

(56) References Cited

U.S. PATENT DOCUMENTS

| 10,495,466 B2 * | 12/2019 | Mwakibinga | B61L 15/0027 |
| 2010/0121563 A1 * | 5/2010 | Chavez | G06Q 10/08 701/533 |
| 2011/0095876 A1 * | 4/2011 | Tanaka | H03G 3/20 340/407.1 |
| 2014/0050122 A1 * | 2/2014 | Pro | H04W 4/029 370/260 |

(Continued)

FOREIGN PATENT DOCUMENTS

| JP | 5317713 | 10/2013 |
| JP | 5808385 | 11/2015 |

(Continued)

OTHER PUBLICATIONS

PCT International Application No. PCT/KR2019/004527, International Search Report dated Nov. 20, 2019, 2 pages.

*Primary Examiner* — Kwasi Karikari
(74) *Attorney, Agent, or Firm* — Lee Hong Degerman Kang & Waimey

(57) ABSTRACT

A method for notifying a user of a disembarkation time by a user equipment (UE) is disclosed. Information about a departure station and information about a destination station are detected not only using at least one of Wi-Fi information and location information collected in an entry station, but also using a station pool. A preceding station located before a disembarkation station is detected not only using a subway line map, but also using at least one of Wi-Fi information and location information collected by the UE on the basis of the detected destination station information. A disembarkation time at a transfer station or at a destination station is pre-notified the user on the basis of the preceding-station recognition time. Therefore, it is possible to pre-notify a user
(Continued)

of disembarkation time information at a transfer station and a destination station on a subway route through 5G network.

18 Claims, 17 Drawing Sheets

(51) Int. Cl.
*H04W 4/029* (2018.01)
*G06Q 50/30* (2012.01)

(58) Field of Classification Search
CPC ....... H04W 4/02; H04W 4/021; H04W 4/025; H04W 4/80; H04W 4/42; H04W 84/12; H04W 12/61; H04W 12/63; H04W 28/0226; H04W 4/024; H04W 4/027; H04W 64/003; H04W 72/048
See application file for complete search history.

(56) References Cited

U.S. PATENT DOCUMENTS

| | | | |
|---|---|---|---|
| 2014/0180735 A1* | 6/2014 | Holm | G06Q 10/02 705/5 |
| 2014/0357261 A1* | 12/2014 | Chiu | H04W 4/027 455/426.1 |
| 2018/0218463 A1 | 8/2018 | Jobling | |

FOREIGN PATENT DOCUMENTS

| | | |
|---|---|---|
| KR | 10-0541772 | 12/2005 |
| KR | 10-0620900 | 8/2006 |
| KR | 10-0788731 | 12/2007 |
| KR | 10-2008-0044008 | 5/2008 |
| KR | 10-0856902 | 8/2008 |
| KR | 10-2011-0071203 | 6/2011 |
| KR | 10-2013-0027832 | 3/2013 |

\* cited by examiner

METHOD FOR NOTIFICATION TO DISEMBARK AND USER EQUIPMENT

CROSS-REFERENCE TO RELATED APPLICATION

Pursuant to 35 U.S.C. § 119, this application claims the benefit of earlier filing date and right of priority to International Application No. PCT/KR2019/004527, filed on Apr. 15, 2019, and also claims the benefit of U.S. Provisional Application No. 62/808,796, filed on Feb. 21, 2019, the contents of which are all hereby incorporated by reference herein in their entirety.

BACKGROUND

Technical Field

The following description relates to a method for notifying a user of a disembarkation time, and a user equipment (UE) using the same, and more particularly to a method for pre-notifying a user of public transportation of a disembarkation time at transit and destination areas, and a user equipment (UE) using the same.

With rapid development of personal mobile communication technology, various kinds of mobile applications capable of notifying users of boarding and disembarkation information about public transportation have rapidly come into widespread use. A representative example from among such mobile applications is a mobile application that notifies users (i.e. passengers) of public transportation such as buses, trains, trams, etc. of an arrival time prior to arriving at a destination station, thereby preventing the users from unexpectedly passing the destination station.

Representative examples of conventional technologies that inform users of public transportation of arrival information to a destination have been disclosed in Korean Patent Registration Nos. 10-0620900, 10-0541772, and 10-0856902 that describe methods and systems for notifying users of public transportation of arrival information over a mobile communication network. However, the above-mentioned related arts have been designed to enable a user to directly select or input a desired destination before the user enters a passenger car or the like, but are unable to inform the user of a transfer station.

In addition, Korean Patent Registration No. 10-0788731 has disclosed a method for notifying a user of a subway destination station using a mobile communication terminal. However, the above-mentioned related art disclosed in Korean Patent Registration No. 10-0788731 has serious disadvantages in that an operation server and a subway system server providing a user with subway service information are needed and a user equipment (UE) carried by the user has to access the operation server so as to receive information about a passenger car number and a destination station, such that the related art disclosed in Korean Patent Registration No. 10-0788731 is considered neither feasible nor practical.

According to the above-mentioned related arts, the user has to directly select or input a departure station and a destination station before entering the passenger car, resulting in greater inconvenience of use, there is a possibility that the user equipment (UE) of the user unexpectedly fails to communicate with a necessary server, and excessive power consumption occurs because information about all transit stations to the destination station is mandatorily sent to the user one by one.

CITED REFERENCE

Patent Documents

Korean Patent Registration No. 10-0620900 (registered on Aug. 30, 2006)
Korean Patent Registration No. 10-0541772 (registered on Dec. 31, 2005)
Korean Patent Registration No. 10-0856902 (registered on Aug. 29, 2006)
Korean Patent Registration No. 10-0788731 (registered on Dec. 18, 2007)

SUMMARY OF THE INVENTION

It is an object of the present disclosure to provide technology that addresses one or more issues of the related arts in which a user has to directly input a departure station and a destination station to receive information about an arrival time at the destination station.

It is another object of the present disclosure to provide technology that addresses one or more issues of the related art about a method for notifying a user of an arrival time at a destination station using a subway location system server.

It is another object of the present disclosure to provide technology that addresses one or more issues of the related art in which a user has to mandatorily confirm an arrival time at each of all transit stations to the destination station, resulting in reduction in power consumption.

It is another object of the present disclosure to provide technology that addresses one or more issues of the related art incapable of providing a user with information about a disembarkation time at a transfer station on a subway route.

It is another object of the present disclosure to provide technology that addresses one or more issues of the related art limited only to GPS information that enables a user to confirm a location of a user equipment (UE).

Objects of the present disclosure are not limited to the above-described objects and other objects and advantages can be appreciated by those skilled in the art from the following description. Further, it will be easily appreciated that the objects and advantages of the present disclosure can be practiced by means recited in the appended claims and a combination thereof.

In accordance with one embodiment of the present disclosure, a method for notifying a user who moves from a departure station to a destination station (n) along a route map by subway, of a disembarkation time may correspond to a method for allowing a user equipment (UE) carried by the user to inform the user of the disembarkation time.

In accordance with one embodiment of the present disclosure, the method for notifying a user who moves from a departure station to a destination station (n) along a route map by public transportation of a disembarkation time may also correspond to a method for allowing a user equipment (UE) carried by the user to inform the user of the disembarkation time.

In other words, the method for notifying the user of a disembarkation time according to one embodiment of the present disclosure can be applied to public transportation such as buses, trains, trams, monorails, subways, etc. without being limited thereto.

In accordance with an aspect of the present disclosure, a method for notifying a user of a disembarkation time may include comparing communication connectivity information or UE location information with a pre-stored database (DB) so as to select an entry station as a departure station. Here, the communication connectivity information or the UE location information may be collected when UE entry to the station is recognized. The method may further include estimating a destination station based on the remaining stations other than the departure station from among a plurality of stations pre-registered in a station pool, selecting each of a transfer station and the destination station as a disembarkation station by referring to a travel route from the departure station to the destination station by referring to a subway line map, and estimating an entry time to a preceding station located before the disembarkation station on the basis of the station entry time. The method may further include recognizing entry to the preceding station by collecting communication connectivity information of the preceding station prior to reaching the entry time of the preceding station, thereby notifying the user of a disembarkation time.

In accordance with another aspect of the present disclosure, a method for notifying a user of a disembarkation time may include detecting information of a departure station not only using at least one of AP information and UE location information, but also using a station pool. The AP information and the UE information may be collected in an entry station. The method may further include detecting information of a destination station based on the remaining stations other than the departure station from among user-preferred stations pre-registered in the station pool, collecting AP information in an preceding disembarkation station located just before a disembarkation station detected by the information of the destination station (n), recognizing entry to the preceding station using the collected AP information, and pre-notifying a user of a disembarkation time of a transfer station or a destination station on the basis of a recognition time of the entry to a certain preceding disembarkation station (m–i).

Here, it should be noted that the scope of the certain preceding disembarkation station (m–i) is not limited only to the station located just before the disembarkation station (m).

In accordance with another aspect of the present disclosure, a method for notifying a user of a disembarkation time may include detecting information of a departure station not only using at least one of AP information and UE location information, but also using a destination pool, detecting information of a destination station based on the remaining destination stations other than the departure station from among user-preferred destination stations pre-registered in the destination pool. Here, the AP information and the UE location information may be collected at the entry time to the departure station. In addition, the method of notifying the user of the disembarkation time may include collecting AP information at an preceding disembarkation station located just before a disembarkation station detected based on information of the destination station (n), recognizing entry to the preceding station using the collected information, and pre-notifying a user of a disembarkation time of either a transfer station or a destination station on the basis of a recognition time of the entry to the certain preceding disembarkation station (m–i).

Here, it should be noted that the certain preceding disembarkation station (m–i) is not limited only to a place located just before the disembarkation station (m).

The information of the departure station may include a departure-station entry time at which entry to the departure station is detected, and a name of the departure station.

The destination station information may include a name of the destination station, a route between the departure station and the destination station, and a name of the disembarkation station.

The method for recognizing entry to the preceding disembarkation station may include estimating a time of entry to the preceding disembarkation station, prior to reaching the estimated entry time to the preceding disembarkation station, and mandatorily collecting at least one of released AP information and released location information.

The entry time to the preceding disembarkation station may be estimated on the basis of a first recognition time at which the user equipment (UE) entering the departure station is recognized, a second recognition time at which the user equipment (UE) entering a passenger car is recognized at the departure station, and information about a timetable or schedule of necessary transportation means.

The method may further include recognizing the user equipment (UE) entering the departure station, and recognizing the user equipment (UE) entering a passenger car at the departure station using at least one of sensing information of the user equipment (UE) and the AP information.

The recognition of the user equipment (UE) entry to the departure station includes recognizing at least one of various UE activities comprised of a UE walking activity, a UE quick-walking activity, a UE running activity, a UE in-elevator activity, and a UE in-escalator activity, each of which is recognized based on at least one movement of the user equipment (UE), and recognizing whether the user equipment (UE) has entered the departure station by referring to the recognized activity.

The method may further include performing a function of mandatorily collecting AP information, and verifying a subway route from the departure station to the destination station using communication connectivity information collected in at least one transit place.

The method may further include, prior to entering the transit place, detecting a deceleration section of a passenger car based on information of cell change per unit time of the user equipment (UE), and performing the function of mandatorily collecting the AP information based on the detected deceleration section.

The station pool may be constructed either using information obtained by a user input or using information obtained by machine learning of the user equipment (UE). The disembarkation station (m) may be detected by at least one UE movement pattern learned by the machine learning.

In accordance with another aspect of the present disclosure, a user equipment (UE) for performing a function notifying a user of a disembarkation time while in motion from a departure station to a destination station (n) along a route by a means of transportation, the user equipment (UE) may include a wireless communication device configured to access a wireless communication network, and a processor configured to detect information of the departure station using at least one of the AP information and user equipment (UE) location information using the wireless communication device. The processor may detect information of the destination station (n) based on the remaining stations other than the departure station from among a plurality of user-preferred places pre-registered in the station pool, may collect AP information at an preceding disembarkation station located just before a disembarkation station detected on a basis of the information of the destination station (n), may recognize entry to the preceding disembarkation station using the collected AP information, and pre-notifies the user of a disembarkation time of either a transfer station or the destination station (n) based on an entry recognition time at which the entry to the station preceding n, the preceding disembarkation station, is recognized.

The user equipment (UE) may further include a memory configured to store the AP information therein. The processor may detect the departure station using a database (DB) of the AP information. The AP information is pre-collected in the entry place and stored. The user equipment (UE) may add personalized AP information acquired by On-Device learning of the user equipment (UE) to the AP information database (DB).

The user equipment (UE) may further include at least one sensor configured to detect at least one movement of the user equipment (UE). The processor may recognize at least one of various UE activities comprised of a UE walking activity, a UE quick-walking activity, a UE running activity, a UE in-elevator activity, and a UE in-escalator activity, each of which is recognized by the at least one movement of the user equipment (UE), and recognize whether the user equipment (UE) enters a station, exits a station, boards a passenger car, or disembarks the passenger car.

The processor may include a first processor and a second processor configured to operate in a low-power domain. The second processor may estimate an entry time to the preceding disembarkation station, and perform a function of mandatorily collecting AP information prior to entering the preceding disembarkation station. The first processor may recognize the entry to the preceding disembarkation station using the collected communication connectivity information.

The processor may include a first processor and a second processor configured to operate in a low-power domain. The second processor may perform a function of mandatorily collecting AP information to collect information of at least one transit place. The first processor may verify a route from the departure station to the destination station using the AP information collected in the transit station.

A method by a user equipment (UE) for a user moving from a departure station to a destination station (n) along a route, the method comprises identifying information of the departure station using first communication connectivity information obtained at the departure station and information from a station pool; identifying information of the destination station (n) based on remaining stations, other than the departure station, from among a plurality of user-preferred stations pre-registered in the station pool; obtaining second communication connectivity information at a preceding disembarkation station that is located before a disembarkation station (m), wherein the disembarkation station (m) is identified based on the information of the destination station (n); identifying entry by the UE to the preceding disembarkation station based on the second communication connectivity information; and providing a notification for the user of a disembarkation time, of either a transfer station or the destination station (n), based on a time of the entry by the UE to the preceding disembarkation station.

The route is a subway route or a transportation route.

The information of the departure station includes a departure-station entry time at which entry by the UE to the departure station occurs, and a name of the departure station.

The information of the destination station (n) includes a name of the destination station (n), the route between the departure station and the destination station (n), and a name of the disembarkation station (m).

The identifying of the entry by the UE to the preceding disembarkation station includes estimating a time of the entry by the UE to the preceding disembarkation station; prior to reaching the estimated entry time to the preceding disembarkation station, obtaining additional communication connectivity information; and identifying the entry by the UE to the preceding disembarkation station using the additional communication connectivity information.

The time of the entry by the UE to the preceding disembarkation station is based on a first recognition time at which the UE has entered the departure station; or the estimated the time of the entry by the UE to the preceding disembarkation station is based on a second recognition time at which the UE has entered a passenger car at the departure station.

The method further comprises recognizing the UE as having entered the departure station, and recognizing the UE as having entered a passenger car at the departure station, both using at least one of sensing information of the UE or the first communication connectivity information.

The recognizing the UE as having entered the departure station includes recognizing at least one activity comprising a walking activity, a quick-walking activity, a running activity, an in-elevator activity, or an on-escalator activity, each of which is recognized based on at least one movement of the UE; and performing the recognizing the UE as having entered the departure station based on the recognizing of the at least one activity.

The method further comprises performing a function of mandatorily collecting communication connectivity information in at least one transit station along the route; and verifying the route from the departure station to the destination station (n) using the mandatorily collected communication connectivity information.

The method further comprises prior to entering the at least one transit station, detecting a deceleration section of a passenger car based on information of cell change per unit time of the UE; and performing the function of the mandatorily collecting the communication connectivity information based on the detected deceleration section.

The method further comprises displaying an identifier of the disembarkation station (m) based on the information of the destination station (n); and performing a request for the user to confirm the displayed identifier of the disembarkation station (m).

The station pool includes either information obtained by user input or information obtained by machine learning of the UE; and the disembarkation station (m) is identified by at least one UE movement pattern learned by the machine learning.

A user equipment (UE), comprises a wireless communication device configured to access a wireless communication network; and a processor configured to identify information of a departure station using first communication connectivity information collected at the departure station and information from a station pool, wherein the departure station is along a route that includes a destination station (n); identify information of the destination station (n) based on remaining stations, other than the departure station, from among a plurality of user-preferred stations pre-registered in the station pool; obtain second communication connectivity information at a preceding disembarkation station that is located before a disembarkation station (m), wherein the disembarkation station (m) is identified based on the information of the destination station (n); identify entry by the UE to the preceding disembarkation station based on the second communication connectivity information; and provide a notification for a user of the UE of a disembarkation time, of either a transfer station or the destination station (n), based on a time of the entry by the UE to the preceding disembarkation station.

The UE further comprises a memory configured to store the first communication connectivity information, wherein the processor is further configured to utilize a database (DB) that includes the first communication connectivity information to identify the departure station; and store, in the memory, personalized communication connectivity information acquired by On-Device learning of the UE.

The UE further comprises at least one sensor configured to detect at least one movement of the UE, wherein the processor is further configured to recognize at least one activity comprising a walking activity, a quick-walking activity, a running activity, an in-elevator activity, or an on-escalator activity, each of which is recognized based on the least one movement of the UE; and recognize the UE as having entered the departure station, exiting the departure station, boarding a passenger car, or exiting from the passenger car.

The processor includes a first processor; and a second processor configured to operate in a low-power domain; estimate an entry time of the UE to the preceding disembarkation station; and perform a function of mandatorily collecting communication connectivity information prior to entering the preceding disembarkation station, and wherein the first processor is configured to recognize the entry of the UE to the preceding disembarkation station using the collected communication connectivity information.

The processor includes a first processor; and a second processor configured to operate in a low-power domain; perform a function of mandatorily collecting communication connectivity information to collect information of at least one transit station, and wherein the first processor is configured to verify the route from the departure station to the destination station (n) using the communication connectivity information collected at the at least one transit station.

The route is a subway route or a transportation route.

As is apparent from the above description, according to the embodiments of the present disclosure, a user who desires to recognize an arrival time at a necessary station need not directly input names of a departure station and a destination station one by one to a user equipment (UE), resulting in increased user convenience.

The embodiments of the present disclosure may allow the user equipment (UE) to autonomously notify the user about arriving at a transfer station and/or a destination station without using a subway location system or public transportation control servers.

The embodiments of the present disclosure may allow the user who holds the user equipment (UE) to pre-recognize a disembarkation time, and may collect communication connectivity information only within a region covered by a preceding station located just before a target station where the user has to alight, resulting in reduction in power consumption.

The embodiments of the present disclosure may pre-notify a user of disembarkation time information at a transfer station and a destination station on a subway route.

The embodiments of the present disclosure may perform activity recognition (AR) without depending on communication connectivity information only, resulting in increased reliability in activity recognition (AR).

In order to adaptively cope with variable user intentions, the embodiments of the present disclosure may autonomously perform route verification, and may receive route confirmation information from the user.

BEST MODE

A method for notifying a user of a disembarkation time and a user equipment (UE) using the same according to embodiments of the present disclosure will hereinafter be described with reference to the attached drawings.

Reference will now be made in detail to embodiments of the present disclosure, examples of which are illustrated in the accompanying drawings. Wherever possible, the same reference numbers will be used throughout the drawings to refer to the same or like parts. In association with the embodiments of the present disclosure, specific structural and functional descriptions are disclosed only for illustrative purposes, the embodiments of the present disclosure can be implemented in various ways without departing from the scope or spirit of the present disclosure. The terms used in the present application are merely used to describe specific embodiments and are not intended to limit the present disclosure. A singular expression may include a plural expression unless otherwise stated in the context. Unless otherwise defined, all terms used herein, including technical or scientific terms, have the same meanings as understood by those skilled in the art. Terms defined in a generally used dictionary may be analyzed to have the same meaning as the context of the relevant art and may not be analyzed to have ideal meaning or excessively formal meaning unless clearly defined in the present application. The terminology used in the present disclosure is for the purpose of describing particular embodiments only and is not intended to limit the disclosure.

A method for notifying a user of a disembarkation time and a user equipment (UE) using the same according to one embodiment of the present disclosure can be applied to public transportation each having a predefined route, for example, trams, trains, subways, buses, etc. For convenience of description and better understanding of the present disclosure, a method for notifying a user of a disembarkation time on a subway route among public transportation and a user equipment (UE) using the same will hereinafter be described for convenience of description and better understanding of the present disclosure.

Figure 1:
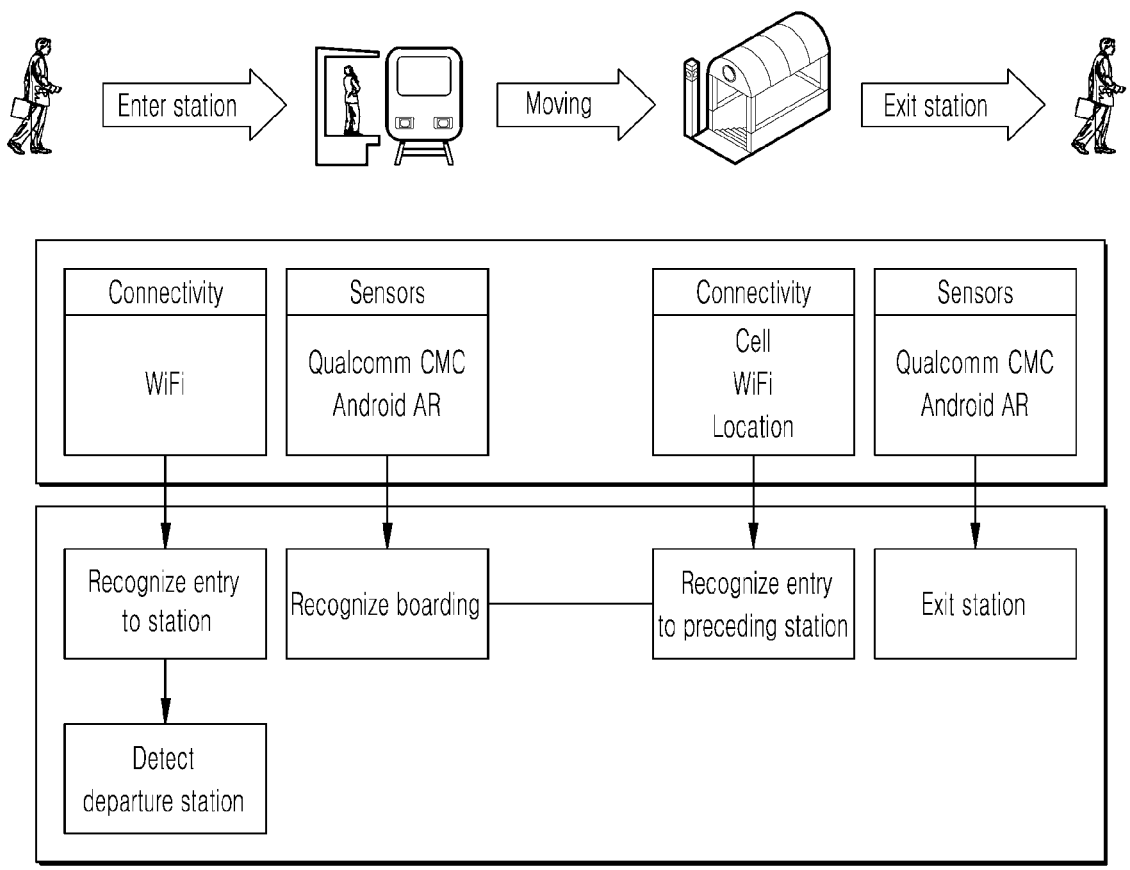
FIG. 1 is a conceptual diagram illustrating an overall process from a station entry time to a station disembarkation time of a user according to an embodiment of the present disclosure.

FIG. 1 is a conceptual diagram illustrating an overall process from a station entry time to a station disembarkation time of a user (i.e. a passenger) according to an embodiment of the present disclosure.

An upper part of FIG. 1 depicts a situation (or activity) in which a user who carries a user equipment (UE) moves from one station to another station by subway. Although not shown in FIG. 1, the user may pass through a transfer station while in motion as necessary. For convenience of description and better understanding of the present disclosure, a station where the user starts to board a first passenger car on a subway route map will hereinafter be referred to as a departure station (1), a station where the user alights (or exits) the first passenger car and then enters another passenger car on the subway route map will hereinafter be referred to as a transfer station, and a station corresponding to the last destination will hereinafter be referred to as a destination station (n). For convenience of description, each of the transfer and destination stations where the user has to get off will hereinafter be referred to as a disembarkation station as necessary.

Figure 2:
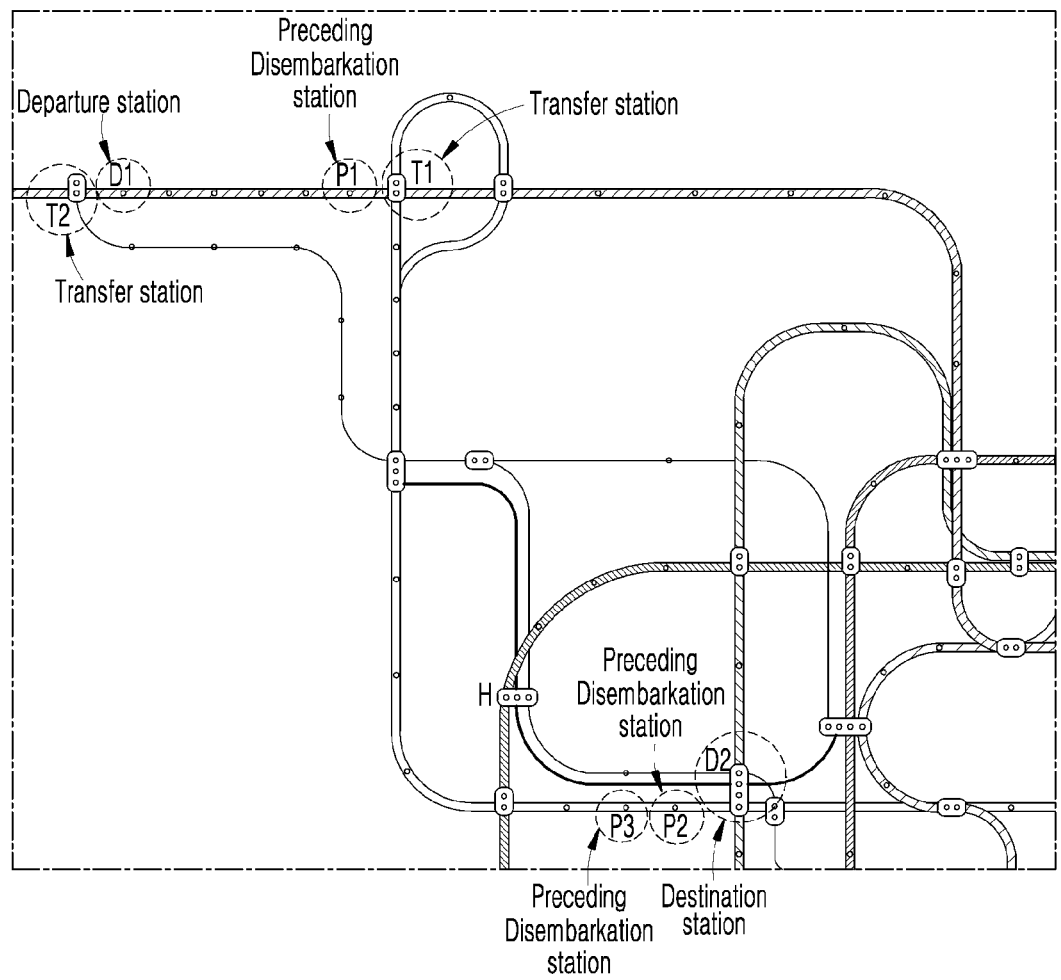
FIG. 2 is a view illustrating some parts of a Seoul subway map including some stations to be mentioned in the present disclosure.

FIG. 2 is a view illustrating some parts of a Seoul subway map including exemplary stations to be mentioned in the following embodiments.

Referring to FIGS. 1 and 2, it is assumed that, on a movement route of a user (i.e. a passenger) of a passenger car, a departure station (1) is set to D1 station, a destination station (n=19) is set to D2 station (19), and T1 station (6) is set to a transfer station (m=6). In this case, a certain preceding disembarkation station (m−i) located before the transfer station (m) may be set to any of P1 station (6−1=5), Jichuk station (6−2=4), etc., and a preceding station (n−j) located before the destination station (n) may be set to any of P2 station (19−1=18), P3 station (19−2=17), etc. Here, "n" depicts the destination station, "m" depicts a transfer station from among a plurality of disembarkation stations, and the number of such transfer stations may be a plural number as necessary. In addition, "i" or "j" depicts an interval between a disembarkation station and a preceding station located before the disembarkation station such that the interval (i) or (j) may be used to calculate a disembarkation time. In the drawings, a reference number allocated to each station may be a serial number to indicate the order of subway stations on a subway route for convenience of description.

A route in which the departure station is set to D1 station and a destination station (n) is set to D2 station will hereinafter be described. When the user searches for all available routes based on conditions of the shortest time to the destination station or a minimum number of transfers needed to arrive at the destination station, four routes are searched for in the subway map. That is, the four routes may be classified into a first route, a second route, a third route, and a fourth route on the basis of the number of transfers. On the first route, a transfer station is set to T2 station, and the shortest time to the destination station is taken. On the second route, the user can arrive at the destination station via T1 station. On the third route, the user can arrive at the destination station via Jongro-3ga station. On the fourth route, the user can arrive at the destination station via T2 Station and Digitalmedia-city station. However, the scope of the present disclosure is not limited to the above-mentioned four routes, and the user may also select other routes to the destination station as necessary.

The station pool may pre-store, as information about candidate stations, names of one or more stations needed to estimate a necessary route to the destination station. The station pool may be pre-registered with names of at least stations respectively corresponding to a departure station and a destination station. Such registration in the station pool may be carried out by a user input or the result of machine learning of a user equipment (UE) carried by the user. In addition, various route patterns of individual time zones, including the morning and evening rush hours, may be learned through such machine learning.

For example, it is assumed that the station pool is pre-registered with D1 station located near a user's home, D2 station located near a user's company, and H station where the user tends to frequently visit on weekends as candidate stations.

A user's favorite route from the departure station (i.e. D1 station) to the destination station (i.e. D2 station) on the way to work may be used in the morning rush hour. If necessary, a user's favorite route in the morning rush hour may be different from a user's favorite route in the evening rush hour. The user may also prefer to use other routes in the remaining time zones other than the morning and evening rush hours. In addition, based on whether there is a high possibility that the user can be easily seated in any passenger seat after entering the passenger car at the departure station, the user may intentionally change a preferred route to another route having a much longer transfer time taken to reach the destination station.

Although the user selects a route including at least one transfer station, the method for notifying the user of the disembarkation time according to the present disclosure may be successively applied to a route from the departure station to the transfer station and to another route from the transfer station to the destination station. Before the user arrives at the transfer station, transfer notification may occur in advance for user alert to the upcoming transfer. Before the user arrives at the destination station, notification of arrival at the destination station may occur in advance to alert the user to the disembarkation time.

Referring back to FIG. 1, a behavior of the user entering the departure station, a behavior of the user moving in the transfer station, and a behavior of the user who alights at the destination station may be carried out by the user by foot, quick walking, running, elevators, escalators, etc. in the departure, transfer or destination station. A behavior of the passenger car entering each station may be carried out by electric power. When the user enters any of the passenger cars, location information of the user equipment (UE) carried by the user may transition from a subway platform region to an indoor region of the passenger car.

Subway stations may be classified into stations located underground (hereinafter referred to as "underground stations") and stations located on the ground (hereinafter referred to as "ground stations"). If the user is present in a certain station located underground, the user may basically access a wireless data transmission system over a wireless communication network such as Wi-Fi, through the user equipment (UE). Even when the user is present in another station located on the ground, Wi-Fi access may also be implemented through the user equipment (UE) carried by the user. In some stations, UE location information indicating the location of the user may be used together with other information or may be used as a substitute as necessary.

Referring back to FIG. 1, an example of communication connectivity information and Activity Recognition (AR) technology used as a solution in the above-mentioned method for notifying the user of the disembarkation time is depicted in the middle of FIG. 1.

Communication connectivity information may include wireless network connection information, for example, information about Wi-Fi access, information about the cell of mobile phones, and GPS location information such as Global Navigation Satellite System (GNSS) information. Although not shown in the drawings, the communication connectivity information may further include information about various Access Points (APs), for example, beacon information, various kinds of wireless network access information to be introduced in the future, etc.

Activity Recognition (AR) technology is a technology that recognizes changes in movement, moving directions, and acceleration of the user equipment (UE) carried by the user using various sensors (for example, an acceleration sensor, a gyro sensor, etc.) embedded in the user equipment (UE) of the user, such that the AR technology can recognize UE movement and user's behavior patterns such as information about whether the user is walking, running, or falling on the ground.

Qualcomm Coarse Motion Classifier (CMC) is an Activity Recognition (AR) Application Program Interface (API) provided by Qualcomm, and provides users with information about various activities (for example, information about whether the user is walking, running, biking, stationary, or driving a vehicle) using sensors included in mobile devices.

Google Activity Recognition (AR) is an Activity Recognition (AR) Application Program Interface (API) provided by Google, and provides users with substantial activity information (e.g. IN_VEHICLE, ON_BICYCLE, ON_FOOT, RUNNING activities, etc.)

The method for notifying the user of the disembarkation time according to one embodiment of the present disclosure may be carried out by a user equipment (UE). Here, the user equipment (UE) may refer to a wireless communication terminal designed to perform communication and computation functions.

Various examples of such wireless communication terminals may include not only a cellular phone, a smartphone having a wireless communication function, a Personal Digital Assistant (PDA), a wireless modem, a portable computer having a wireless communication function, an image capturing device such as a digital camera having a wireless communication function, a gaming device having a wireless communication function, a music storage and playback appliance having a wireless communication function, an electronic appliance having a wireless Internet access and browsing function, but also other portable units or terminals implemented as a combination of the above-mentioned devices and functions, without being limited thereto.

In accordance with one embodiment of the present disclosure, the user equipment (UE) 100 may be implemented either as a dedicated computing device or as a general-purpose computing device. The dedicated computing device may be dedicated to a function of notifying the user of a disembarkation time, such that the dedicated computing device may perform computation needed to perform various capabilities that are implementable by the above-mentioned notification function using a controller 160. The general-purpose computing device may access various wireless communication networks using a wireless communication device 130, and may further include the function of notifying the user of the disembarkation time as well as various other kinds of functions.

Figure 3:
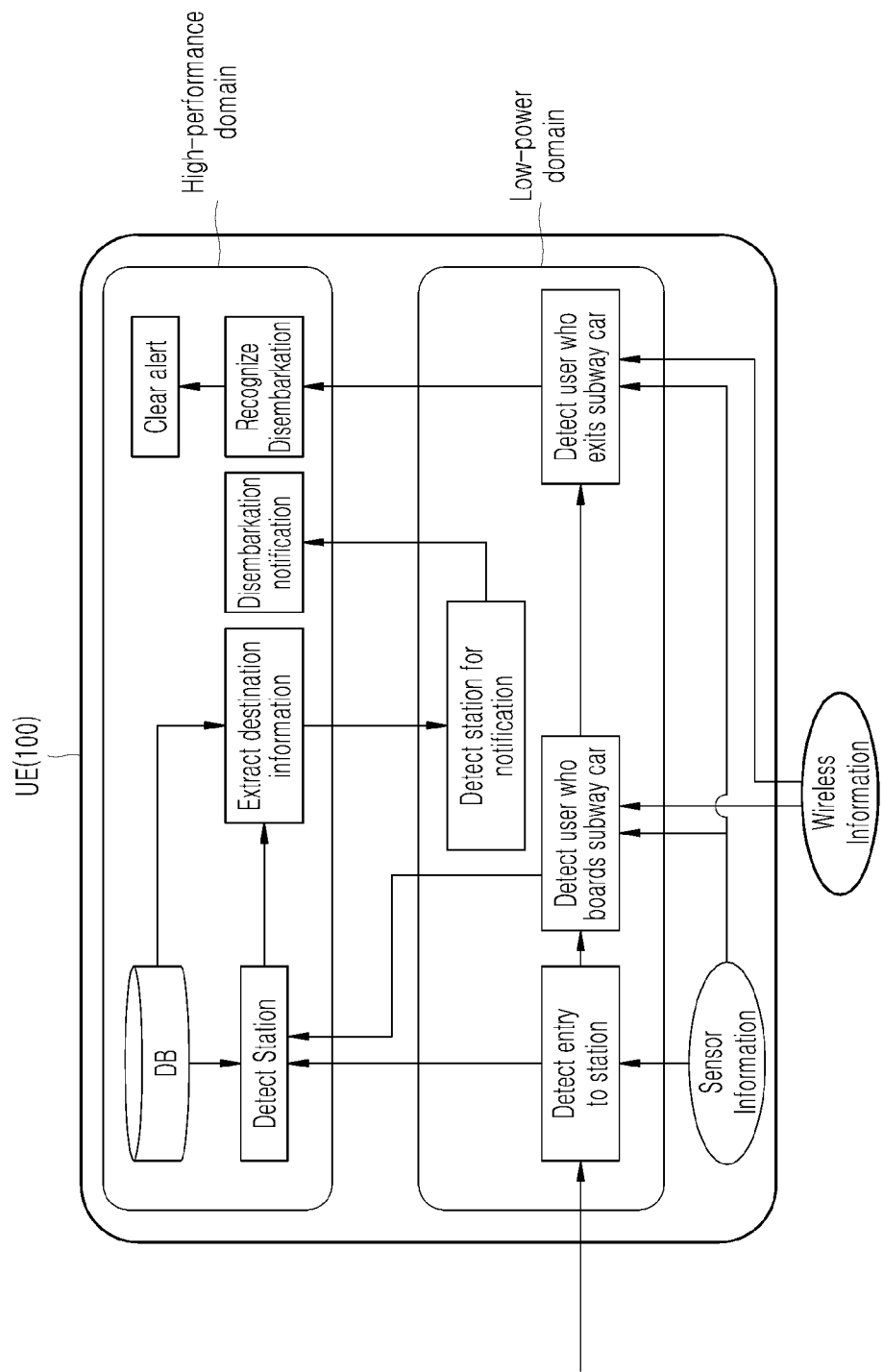
FIG. 3 is a block diagram illustrating functions of individual domains needed for a user equipment (UE) that notifies a user of a disembarkation time according to an embodiment of the present disclosure.

FIG. 3 is a block diagram illustrating functions of individual domains needed for the user equipment (UE) that notifies the user of a disembarkation time according to an embodiment of the present disclosure.

Referring to FIG. 3, a user equipment (UE) designed to receive wireless communication information is illustrated. The user equipment (UE) may execute various commands constructing an application scheduled to perform the method for notifying the user of the disembarkation time on a subway route map in different ways according to whether the corresponding command belongs to a high-performance domain or a low-power domain. In the high-performance domain, computation capability may have higher priority than power-saving capability. In the low-power domain, the power-saving capability may have higher priority over the computation capability.

The user equipment (UE) 100 carried by the user according to one embodiment of the present disclosure may perform a function of detecting whether the user has entered the subway station, a function of detecting whether the user has entered the passenger car, a function of detecting arrival at the subway station needed for user notification, and a function of detecting whether the user has to alight from the passenger car, through the low-power domain. For example, Wi-Fi scanning is needed for the user equipment (UE) 100 to detect whether the user has entered the subway station. However, much more power may be consumed according to scanning modes and scanning cycles, such that it is preferable that Wi-Fi scanning be performed in the low-power domain.

Further, in order to minimize power consumption needed for Wi-Fi scanning, there is a need for the user equipment (UE) to mandatorily perform at least periodic scanning.

Figure 4:
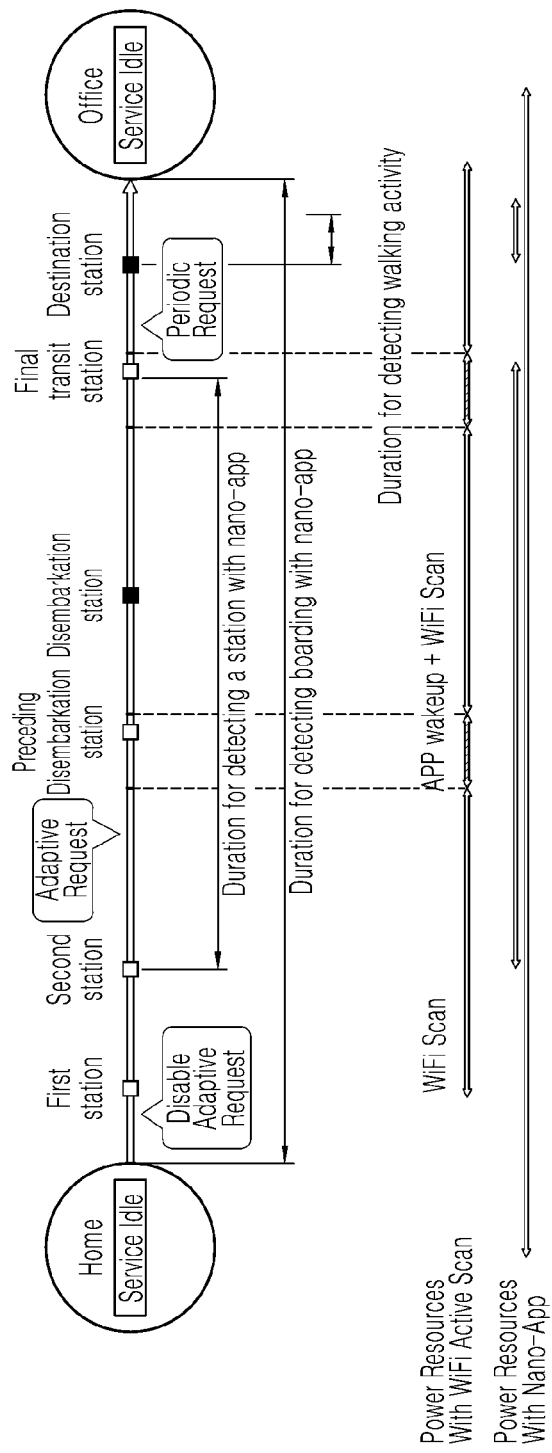
FIG. 4 is a conceptual diagram illustrating a method for allowing a user equipment (UE) to collect communication connectivity information according to an embodiment of the present disclosure.

FIG. 4 is a conceptual diagram illustrating a method for allowing the user equipment (UE) to collect communication connectivity information according to an embodiment of the present disclosure.

As can be seen from FIG. 4, among various subway routes from the user's home to the user's office, a representative subway route from a first station (i.e. a departure station) to the destination station via the transfer station is illustrated. A function of collecting communication connectivity information can operate in two modes, for example an adaptive request mode and a periodic request mode. The periodic request mode may be considered a mandatory collection function. Since the scope of an operation start time at which the adaptive request starts activation is restricted only to occurrence of any event, cycles for the adaptive request may be considered irregular and cycles for the periodic request may be considered regular. Therefore, the UE 100 may consume much more power than the adaptive request.

The adaptive request may be released to the first station. When the user enters the first station, the user equipment (UE) may sense Wi-Fi signals and then perform the adaptive request. If the presence of the user who enters the passenger car is detected, low-power control programs such as Nano-App may start operation. Under the condition that low-power control programs are primarily executed in the low-power domain, the low-power control program may awaken high-performance applications and then perform transition to the Wi-Fi scanning mode.

Referring back to FIGS. 3 and 4, during the adaptive request in which the user equipment (UE) performs such adaptive requests to collect power-saving information and secure communication connectivity information, the user equipment (UE) may mandatorily perform the periodic request (i.e. mandatory collection processing) to recognize arrival to one preceding station (i.e. "transfer-ready station" in FIG. 4) located just before the transfer station and another preceding station (i.e. "final transit station" in FIG. 4) located just before the destination station. In each of a first section affected by the transfer-ready station and the transfer station and a second section affected by the final transit station and the destination station, the user equipment (UE) 100 may execute the application or commands for capabilities about station detection, destination information extraction, disembarkation notification, disembarkation recognition, and notification deletion, using the high-performance domain.

Referring back to FIG. 3, sensor information may be used alone or as an auxiliary indicator in relation to communication connectivity information. For activity recognition (AR) of the user or the user equipment (UE) 100, the sensor information may be used to detect whether the user has entered the subway station, whether the user has entered the passenger car, and whether the user has to alight from the passenger car.

Figure 5A:
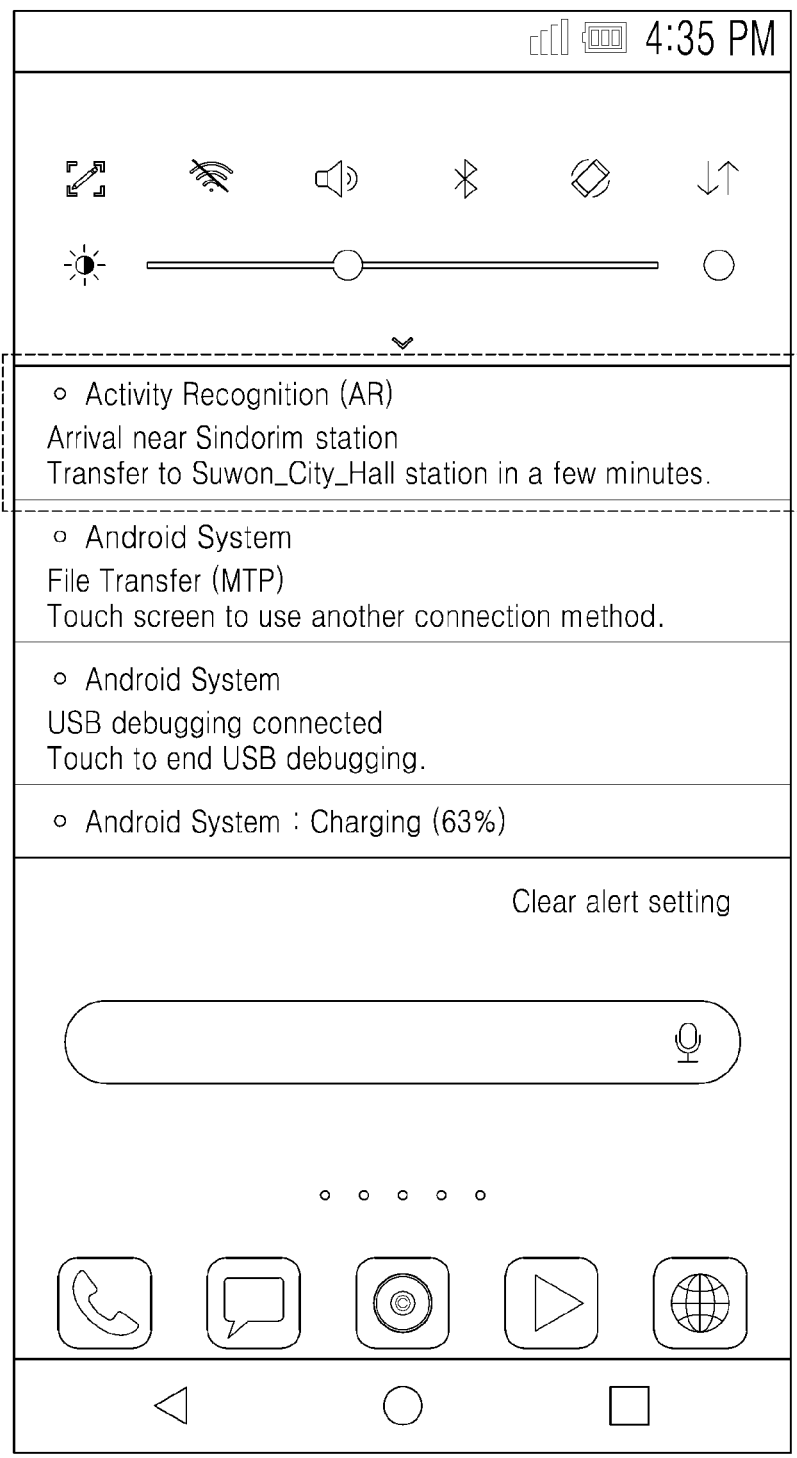
FIGS. 5A and 5B are views illustrating examples of a user interface (UI) displayed on a user equipment (UE) according to an embodiment of the present disclosure.
Figure 5B:
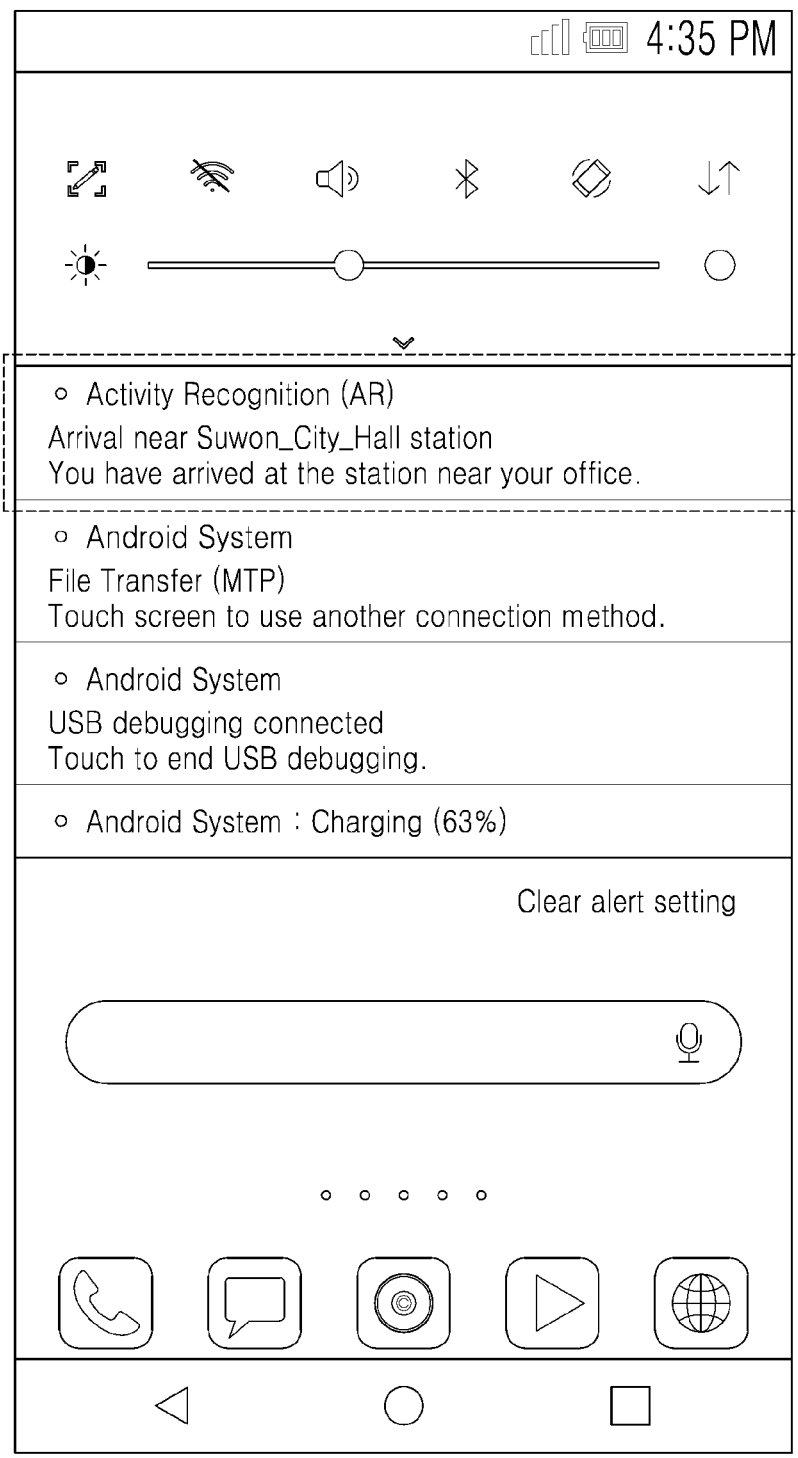

FIGS. 5A and 5B are views illustrating examples of a user interface (UI) displayed on the user equipment (UE) according to an embodiment of the present disclosure.

Examples of User interface (UI) display images of the user equipment (UE) 100 configured to perform the method to notify the user of the disembarkation time according to one embodiment of the present disclosure are shown in FIGS. 5A and 5B. The user equipment (UE) 100 may provide the user with a first user interface (UI) for receiving input data needed to execute the above-mentioned notification method and a second user interface (UI) for outputting data, through a display device embedded therein.

The first user interface (UI) of the user equipment (UE) 100, which allows the user to input necessary commands to a disembarkation-time notification application module which operates in combination with hardware, may be configured to be compact in size so as to include only a minimum number of functions preferred by the user, for example, a function for enabling the user to input names of desired stations frequently used in the station pool storing names of many stations, a function for turning transfer-station notification on or off, and a function for turning a notification service on or off.

FIG. 5A illustrates an example of a notification display image displayed on the user equipment (UE) 100, such that the user who views the notification display image of FIG. 5A can recognize a disembarkation time in advance before entering the transfer station (e.g. Sindorim station). FIG. 5B illustrates an example of a notification display image displayed on the user equipment (UE) 100, such that the user who views the notification display image of FIG. 5B can recognize a disembarkation time in advance before entering the destination station (e.g. Suwon_City_Hall station). If the disembarkation-time notification function is activated, the above-mentioned display images are displayed and, at the same time, vibration and ringtones may also occur.

Figure 6:
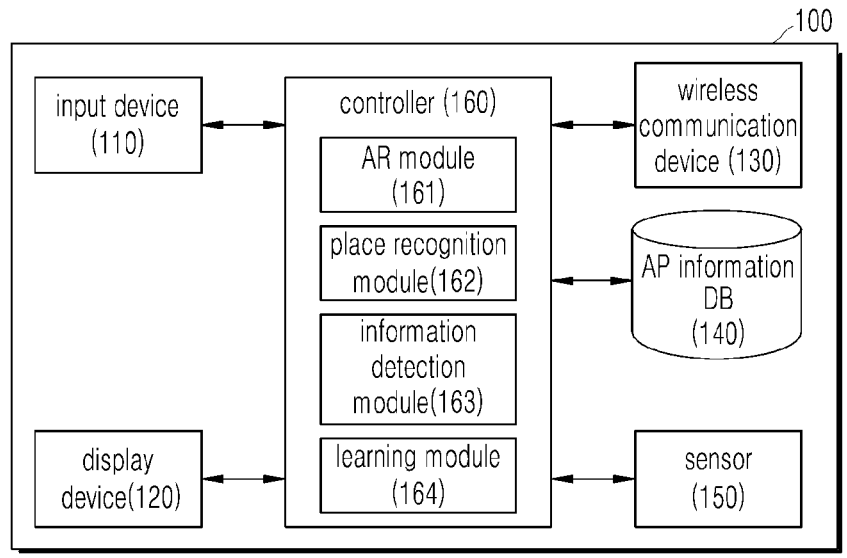
FIG. 6 is a block diagram illustrating a user equipment (UE) according to an embodiment of the present disclosure.

FIG. 6 is a block diagram illustrating the user equipment (UE) according to an embodiment of the present disclosure.

Referring to FIG. 6, the user equipment (UE) 100 may include an input device 110, a display device 120, a wireless communication device 130, an Access Point (AP) information database (DB) 140, a sensor 150, and a controller 160. In this case, the controller 160 may include an activity recognition (AR) module 161, a place recognition module 162, an information detection module 163, and a learning module 164.

The input device 110 may receive commands from the user. The input device 110 may be implemented as a physical key or a touchscreen designed to further use piezoelectric or capacitance effects.

The display device 120 may display various kinds of user interfaces (UIs), for example, a user interface (UI) for receiving information about the disembarkation-time notification function, and a user interface (UI) for outputting information about the disembarkation-time notification function.

The wireless communication device 130 is a device that enables the user equipment (UE) 100 to access a wireless communication network, for example, 3G, 4G LTE, 5G LTE, or Internet, such that the user equipment (UE) 100 can implement transmission and reception of data. The user equipment (UE) 100 may collect communication connectivity information using the wireless communication device 130. The wireless communication device 130 may include, for example, various wireless local area network (WLAN) modules, a Wi-Fi module, a GPS module, a modem for mobile phones, etc.

The AP information DB 140 may be stored in a storage device, may be used as a database (DB) having communication connectivity information pre-collected in stations such as subway stations, and may include unique characteristics of individual information collected in many subway stations.

The storage device may store various kinds of information associated with subway services, for example, a subway line map database (DB) and a subway timetable database (DB).

The sensor 150 may be used as a device to detect movement, acceleration, and detection of the user equipment (UE) 100. For example, the sensor 150 may be implemented as a gyro sensor, an acceleration sensor, etc.

The controller 160 may serve to execute various functions needed for the method for notifying the user of the disembarkation time according to one embodiment of the present disclosure. For example, the controller 160 may be implemented either as a set (or aggregate) of modules configured to perform different functions or as a general-purpose computing device implemented by a combination of processors and memories. For convenience of description, the former example will hereinafter be described as follows.

The activity recognition (AR) module 161 based on the above-mentioned AR technology may recognize various activities of the user or the user equipment (UE) 100 upon receiving sensing information from the sensor 150.

The place recognition module 162 may recognize presence or absence of a subway station closer to the user using the AP information DB 140 having communication connectivity information pre-collected in many stations (e.g. subway stations), and may detect name information of the recognized subway station.

In addition, the place recognition module 162 may recognize a target place (e.g. a subway station) using location information and cell information, and may detect the name of a recognized place (i.e. the recognized subway station) based on map data.

The information detection module 163 may acquire various parameter values by performing computation based on various types of data, for example, a train timetable, a subway timetable, an AP information DB, and the like. For example, the parameter values may include an estimated route from the departure station to the destination station, information about transfer stations located between the departure station and the destination station, an estimated disembarkation time, etc. After the information detection module 163 detects the presence of the user who has entered the passenger car at the departure station, the information detection module 163 may detect a subway-car entry time of the user equipment (UE) 100 based on the subway timetable stored in the storage device.

The learning module 164 may serve to generate an On-Device-Learning personalized database (DB) using various kinds of information (e.g. the user's subway usage information, sensing information, communication connectivity information) being collected by the user equipment (UE) 100 performing the method to notify the user of the disembarkation time.

The controller 160 of the user equipment (UE) 100 according to one embodiment of the present disclosure may be configured to have hardware and software combined with the hardware. The hardware may be configured to have a processor 165 and a memory 166. The software may be configured to have an Operating System (OS), middleware, Application Program Interfaces (APIs), and applications.

The user equipment (UE) 100 may execute various types of software stored in the memory 166, for example, the application module having a function of notifying of the disembarkation time, through computation of the processor 165, such that the above-mentioned method for notifying the user of the disembarkation time can be carried out. In addition, the user equipment (UE) 100 may access various wireless communication networks using the wireless communication device 130.

Figure 7:
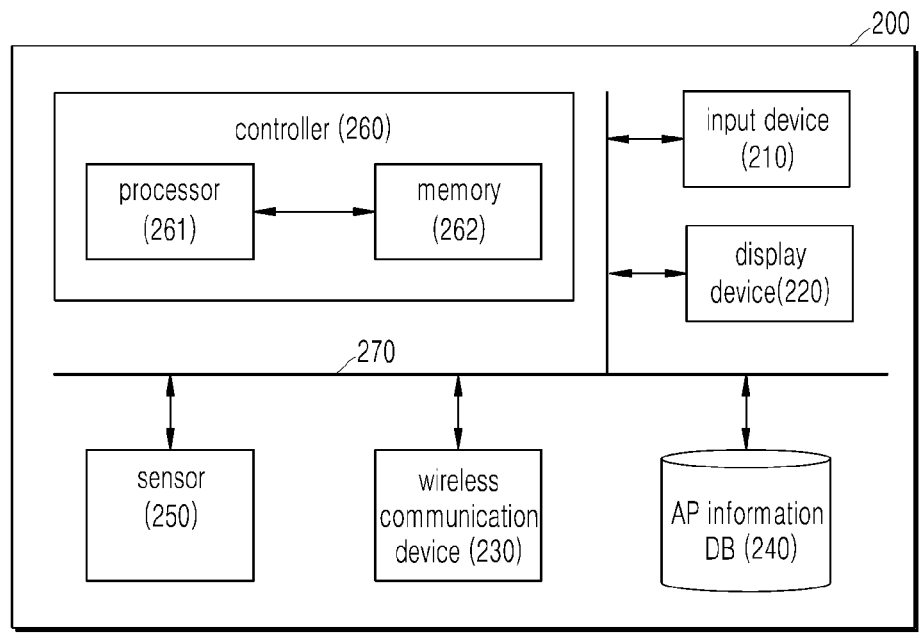
FIG. 7 is a block diagram illustrating a user equipment (UE) according to another embodiment of the present disclosure.

FIG. 7 is a block diagram illustrating a user equipment (UE) 200 according to another embodiment of the present disclosure.

Referring to FIG. 7, a controller 260 of the user equipment (UE) 200 may be configured to have a processor 261 and a memory 262 as hardware.

The memory 262 may store a code logic needed to execute various command sets of an application module having a function of notifying the user of the disembarkation time. Through computation of the code logic, the processor 261 may execute an application module having the function of notifying the user of the disembarkation time.

Respective functions to be performed by the user equipment (UE) 200 according to one embodiment of the present disclosure may be carried out by different processing units. For example, when an event occurs in the user equipment (UE) 100 of FIG. 3, the application module or command, which detects information about necessary subway stations for the event, extracts information about the destination station, notifies the user of disembarkation information, and recognizes disembarkation completion, may be driven by a first processor such that a sufficient amount of power can be supplied to the user equipment (UE) 100 during driving of the first processor.

On the other hand, various communication modules, for example, a Wi-Fi module, needed to control high-power-consumption wireless communication devices may be driven by a second processor, and can operate in a low-power mode. In this case, the first processor may be implemented as a Central Processing Unit (CPU), and the second processor may be implemented as a low-power Digital Signal Processor (DSP).

The processor 262 for use in the user equipment (UE) 100 may also be referred to as an Application Processor (AP). The processor 262 may include a plurality of processing units specialized for various functions, for example, a Central Processing Unit (CPU) having a general computation function, a multimedia-usage ISP, a low-power digital signal processor (DSP), and the like.

Figure 8:
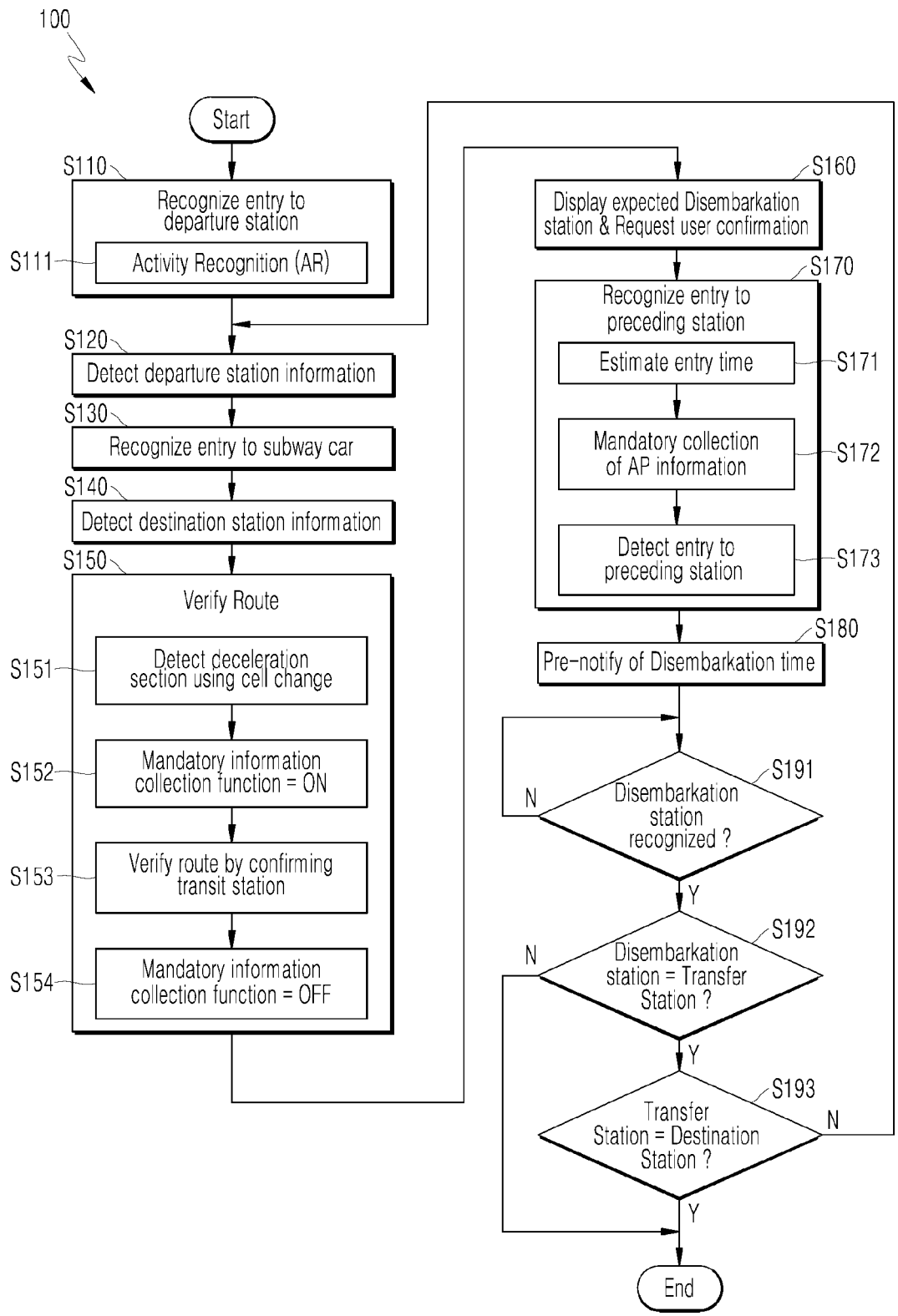
FIG. 8 is a flowchart illustrating a method for notifying a user of a disembarkation time according to an embodiment of the present disclosure.

FIG. 8 is a flowchart illustrating a method for notifying a user of a disembarkation time according to an embodiment of the present disclosure.

Referring to FIG. 8, a method S100 for notifying the user of the disembarkation time according to one embodiment may include a plurality of steps S110 to S193.

Steps S110 to S193 included in the notification method S100 may be carried out by the user equipment (UE) 100 during sequential processing in which the user having the user equipment (UE) 100 enters the departure station, moves from a station platform to an indoor space of the passenger car, receives a disembarkation notification message, and alights the passenger car at the transfer station and the destination station.

In this case, the method S100 for notifying the user of the disembarkation time need not always include all steps S110 to S193, and may be implemented in various formats through a combination of steps S110 to S193. In other words, steps S110 to S193 may be classified into optional steps and mandatory steps.

First, the user equipment (UE) 100 may recognize presence or absence of a user who has entered one station corresponding to the departure station (S110). The user equipment (UE) 100 may recognize the presence or absence of the user who has entered the departure station through communication connectivity information (e.g. AP information or Wi-Fi information) collected in the user-entry station.

The user equipment (UE) 100 may detect various kinds of motion of the user using the sensing information, and may detect a user behavior composed of a combination of several motions, resulting in implementation of activity recognition (AR) of the user behavior.

For example, the user equipment (UE) 100 may recognize various activities indicating behavior patterns of the user who is walking, running, or moving by elevators, escalators, moving walkways, etc. in the subway stations.

Subsequently, the user equipment (UE) 100 may detect information about the departure station (S120).

When the user enters the departure station, the user equipment (UE) 100 may collect communication connectivity information (for example, AP information or Wi-Fi information) from wireless communication devices installed in the departure station by scanning. The user equipment (UE) 100 may refer to information stored in the AP information data DB (i.e. Wi-Fi information DB) installed in the subway station, and may detect not only an entry time at which the user enters the departure station, but also a name of the departure station. In this case, location information or cell information may also be used as communication connectivity information.

Subsequently, the user equipment (UE) 100 may detect whether the user has entered the passenger car at the departure station (S130). That is, the user equipment (UE) 100 may detect whether the user boards the passenger car at the departure station (S130).

The user equipment (UE) 100 may recognize whether the user has entered the passenger car either using communication connectivity information collected in the passenger car or using a situation in which the communication connectivity information of the departure station is no longer collected.

In step S110 or S130, the user equipment (UE) 100 may recognize a user's behavior (e.g. information about whether the user is moving on elevators or escalators) using the activity recognition (AR) technology to detect various activity recognition (AR) information, resulting in increased reliability in the recognized behavior information of the user who has entered the departure station and the passenger car.

Subsequently, the user equipment (UE) 100 may detect information about the destination information (S140). Here, the order of steps S130 and S140 may be changed to another as necessary. In other words, the user equipment (UE) 100 may detect information of the destination station after recognizing the presence of the user who has entered the departure station or the passenger car.

A specific time at which the user equipment (UE) 100 recognizes the presence of the user who has entered the departure station or the passenger car may be considered a departure time of the user.

In order to detect information about any other stations where the user has to alight, the user equipment (UE) 100 may estimate which one of the remaining stations other than the recognized departure station from among all stations belonging to the station pool will be used as the destination station (S140). For example, referring back to FIG. 1, in a condition that some stations, for example, D1 station, and D2 station, are pre-registered in the station pool, if D1 station is recognized as the departure station, the user equipment (UE) may estimate D2 station as the destination station. For convenience of description and better understanding of the present disclosure, it is assumed that the user moves along a second route from the departure station to D2 station by subway.

The user equipment (UE) may estimate an overall route from the departure station to the destination station by referring to the subway line map. In this case, although there are a variety of subway routes from the departure station to the destination station as can be seen from FIG. 1, the user equipment (UE) 100 may perceive the user's intention by referring to the user's past movement history collected by learning, a route verification step S150, or a user-confirmation requesting step S160. For example, if H station is set to be one destination station, since the user tends to select a specific route in which T2 station is set to a transfer station, the user equipment (UE) 100 may recognize the direction of a departure station where the user begins to move by subway by referring to Wi-Fi information, location information or cell information to be collected since D1 station, and may thus estimate that a final destination station is D2 station.

The user equipment (UE) 100 may estimate a user's entry time to one station where the user has to alight or another user's entry time to a preceding station located just before the one station (S171). If estimation of the destination station is completed, the user equipment (UE) 100 may detect the presence or absence of any transfer station needed to reach the destination station, rather than immediately estimating a disembarkation time of the last destination station, such that the user equipment (UE) 100 may recognize whether there is a high possibility that the user will transfer to another subway line. If the presence of the transfer station is decided, the user equipment (UE) 100 may estimate and detect a user's entry time at the decided transfer station or a user's entry time at a preceding station of the decided transfer station. In more detail, the user equipment (UE) 100 may estimate a user's entry time to a transfer station (e.g. T1 station) or a preceding station (e.g. P1 station) located earlier than the transfer station. In order to estimate a user's entry time at the transfer station or the preceding station, the user equipment (UE) needs to designate a reference point of a time period to be consumed for such estimation.

One entry recognition time decided by the user equipment (UE) 100 at the departure station may be obtained later than another entry recognition time corresponding to the actual user's entry time at the departure station, because a predetermined period of time is needed for the user equipment (UE) 100 to collect communication connectivity information at the departure station.

At an entry recognition time at which the user equipment (UE) 100 determines that the user has entered the departure station, the user equipment (UE) 100 may operate a timer to estimate an entry time to any necessary preceding station or transfer station. In this case, one entry recognition time selected from among a plurality of entry recognition times where the user equipment (UE) 100 determines that the user has entered the departure station, which is located nearest to an actual departure time at which the passenger car substantially exits the departure station, may be selected as a reference value for estimating a necessary disembarkation time.

If it is assumed that the passenger car on which the user travels is driven according to a normal subway schedule, the user equipment (UE) 100, having recognized the user's departure at the departure station, may select one departure time from among a plurality of departure times stored in the subway schedule, which is located nearest to the user's departure time recognized by the user equipment (UE) 100, such that the user equipment (UE) 100 may determine the selected departure time to be a reference point for estimating a necessary time duration to be consumed.

If there occurs an unexpected situation in which the user who has entered the departure station does not immediately board the passenger car at the departure station within a predetermined period of time from the user's entry time detected at the departure station, the user equipment (UE) 100 may reset the timer and then begin to recalculate the reference point using the timer. For example, the above-mentioned situation may include one case in which the user equipment (UE) 100 carried by the user who has entered the departure station continuously remains at the departure station for a relatively long period of time, and another case in which Wi-Fi information corresponding to the departure station is continuously scanned for a predetermined period of time or longer.

Alternatively, the user equipment (UE) 100 may verify the estimated route (S150). The user equipment (UE) 100 may verify a movement route of the user on the subway map using cell information, Wi-Fi scanning, and location information. For convenience of description and better understanding of the present disclosure, a method for performing such route verification by collecting cell information will hereinafter be described.

The route verification step S150 may include steps S151 to S154.

First, the user equipment (UE) 100 may recognize a deceleration section of the passenger car prior to entering a target station to be verified using cell information about change in cells (S151). A method for detecting the deceleration section of the passenger car using the cell-change information will be described with reference to FIGS. 17 and 18.

Subsequently, the user equipment (UE) 100 may mandatorily collect communication connectivity information in the recognized deceleration section (S152). For example, such mandatory collection of the communication connectivity information may refer to an operation state in which a mode of collecting Wi-Fi information is changed from an adaptive request mode to a periodic request mode.

Subsequently, the user equipment (UE) 100 may confirm the above target station using the collected communication connectivity information (S153), resulting in route verification (S153).

Subsequently, the user equipment (UE) 100 may release the function of mandatorily collecting the communication connectivity information (S154). Through a series of the above operations, the user equipment (UE) 100 may perform route verification without the necessity of recognizing user's entry at each of all the stations included in the estimated route.

Alternatively, the user equipment (UE) 100 may display an expected disembarkation station on the estimated route, and may request that the user confirm whether the expected disembarkation station is right or wrong (S150). For example, if it is assumed that the user shown in FIG. 1 moves by subway along a route in which T2 station is set to a transfer station, this means that the user's departure time detected at the departure station and a transfer time where the user has to transfer are located close to each other, such that there is a need to increase reliability of such route verification.

In this case, the user equipment (UE) 100 may display a next disembarkation station expected on the estimated route, and may request that the user confirm whether the displayed disembarkation station is right or wrong. For example, the user equipment (UE) 100 may display a message for enabling the user to confirm whether T2 station is a transfer station, and may further display another message for enabling the user to accept or cancel the displayed disembarkation station as necessary. In this case, if there is no user input to the user equipment (UE) 100, the user equipment (UE) 100 may notify the user of at least one disembarkation time based on the estimated route.

Subsequently, the user equipment (UE) 100 may recognize whether the user has entered a preceding station located just before the disembarkation station (S170). Here, step S170 may include steps S171 to S173.

If it is determined that the passenger car is running along the route estimated by the user equipment (UE) 100, there is a need for the user equipment (UE) 100 to first recognize whether to reach an first transfer station (i.e. a first disembarkation station from among a plurality of disembarkation stations included on the estimated route) or a destination station.

As shown in step S150, the user equipment (UE) 100 may recognize the user's arrival at the preceding station (also called an alight-ready station) of the disembarkation station where the user has to alight using cell information. In this case, a method for recognizing whether the user has entered the above-mentioned preceding station by collecting Wi-Fi information from among the communication connectivity information will hereinafter be described in detail.

First, before the user equipment (UE) 100 recognizes the user's entry to the preceding station, the user equipment (UE) may estimate an entry time (hereinafter referred to as a preceding-station entry time) at which the user enters the preceding station (S171) in advance. The preceding-station entry time may be detected by adding a time duration from the departure time to the preceding station to the departure time detected at the departure station. In this case, the departure time may be considered an actual boarding time at which the user enters a passenger car at the departure station. However, the user equipment (UE) 100 substantially has difficulty in correctly recognizing the actual boarding time, such that a departure-station recognition time at which the departure station is recognized by the user equipment (UE) 100 or a boarding recognition time at which the user enters the passenger car may be used instead of the actual boarding time as necessary. In addition, the above-mentioned time duration to be consumed from the departure station to the preceding station of the disembarkation station may be estimated by referring to the subway timetable.

In order to collect communication connectivity information (e.g. Wi-Fi information) collected in the preceding station of the disembarkation station, through estimation of the above-mentioned time duration, the user equipment (UE) 100 may perform mandatory collection of the communication connectivity information prior to entering the preceding station (S172). Here, execution of the mandatory collection of the communication connectivity information may be achieved by switching from a current Wi-Fi scanning mode to a periodic request mode.

Subsequently, the user equipment (UE) 100 may recognize the user's entry to the preceding station of the disembarkation station (S173), and may notify the user of a disembarkation time in advance (S180). The user equipment (UE) 100 may pre-notify the user of the disembarkation time using vibration, ringtones, sound, and a display image to be displayed thereon.

The term "disembarkation" for use in the embodiments of the present disclosure may conceptually include a first disembarkation action at the transfer station and a second disembarkation action at the final destination station. Therefore, step S170 may be considered a disembarkation action for transfer to another subway line at the transfer station or a disembarkation action at the final destination station.

The remaining steps S191 to S193 may correspond to a process of determining whether the user equipment (UE) 100 recognizes the destination station after passing at least one disembarkation station. After the user equipment (UE) 100 recognizes the disembarkation station, the user equipment (UE) 100 may detect whether the recognized disembarkation station is the transfer station. If the recognized disembarkation station corresponds to the transfer station or if the transfer station does not correspond to the transfer station, the user equipment (UE) 100 may continuously perform the process of notifying the user of the disembarkation time at the following station.

In steps S191 to S193, the user equipment (UE) 100 may perform each determination using a personalized database (DB) acquired by machine learning based on information about a plurality of subway stations registered in the station pool. For example, through such machine learning, the user equipment (UE) 100 may acquire information about a subway station located nearest to a user's home, information about a subway station located nearest to a user's office, and information about a transfer station, such that the user equipment (UE) 100 may determine whether the disembarkation station where the user has to alight corresponds to the transfer station or the destination station.

Figure 9:
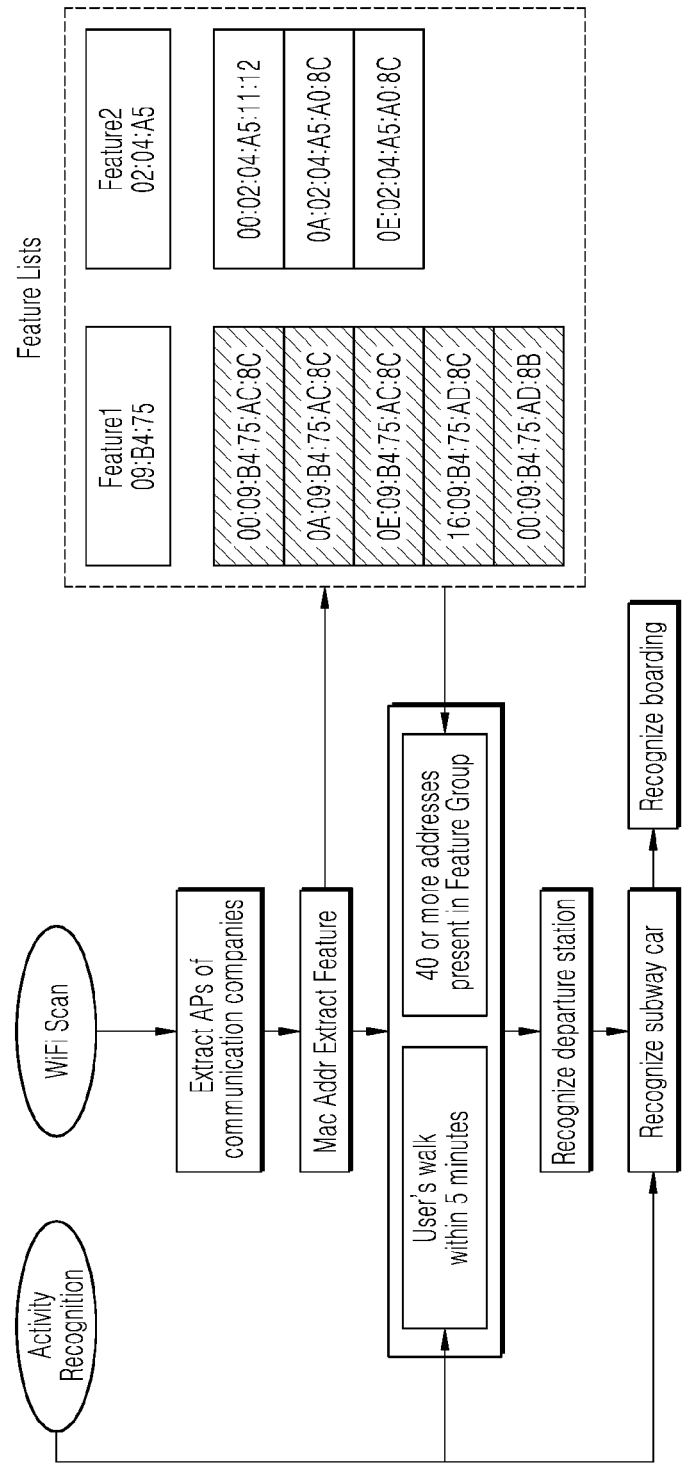
FIGS. 9 and 10 are flowcharts illustrating some parts of a method for notifying a user of a disembarkation time according to an embodiment of the present disclosure.
Figure 10:
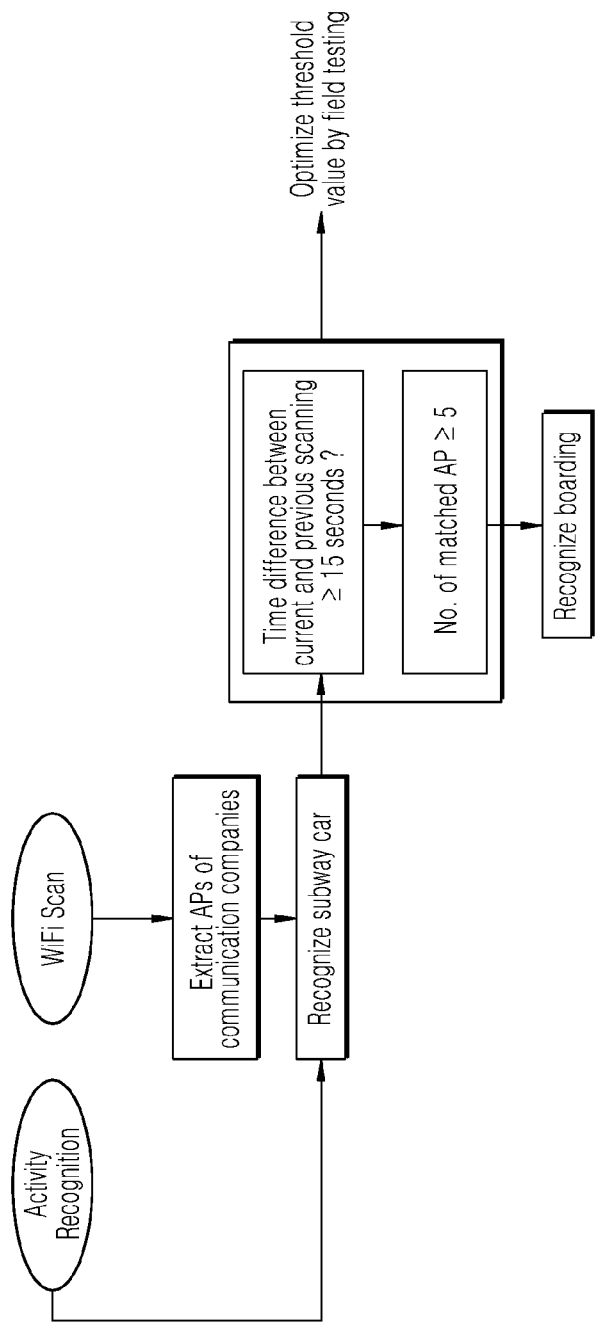

FIGS. 9 and 10 are flowcharts illustrating some parts of a method for notifying a user of a disembarkation time according to an embodiment of the present disclosure.

FIG. 9 illustrates examples of activity recognition (AR) and collection of communication connectivity information (Wi-Fi Scan). The process (Wi-Fi Scan) of collecting communication connectivity information may include extracting access points (APs) of respective mobile telecommunication companies, and extracting features (characteristics) of a Media Access Control (MAC) address, etc. In FIG. 9, a list of features (Feature List) may refer to an example of the AP information DB. The user equipment (UE) 100 may detect not only a departure-station entry time at which the user enters the departure station, but also a name of the departure station, by referring to AP information collected in the departure station. After the user equipment (UE) recognizes information about the departure station as described above, the user equipment (UE) 100 may perform recognition of the passenger car carrying the user and recognition of user's boarding.

In the activity recognition (AR) process, an exemplary activity in which the user's walking is recognized within a threshold time (for example, 5 minutes or less) may be additionally used in the process of recognizing user's entry to the departure station.

FIG. 10 illustrates an exemplary activity for recognizing whether the user has entered the passenger car using the user equipment (UE) 100. The user equipment (UE) 100 may recognize the passenger car by extracting access point (AP) information of mobile telecommunication companies. If a time difference between current Wi-Fi scanning and previous Wi-Fi scanning is 15 seconds or longer, and if the number of access points (APs) matched to the AP information DB is 5 or greater, UE boarding may be recognized. In this case, a threshold value such as the time difference may be optimized by field testing.

Figure 11:
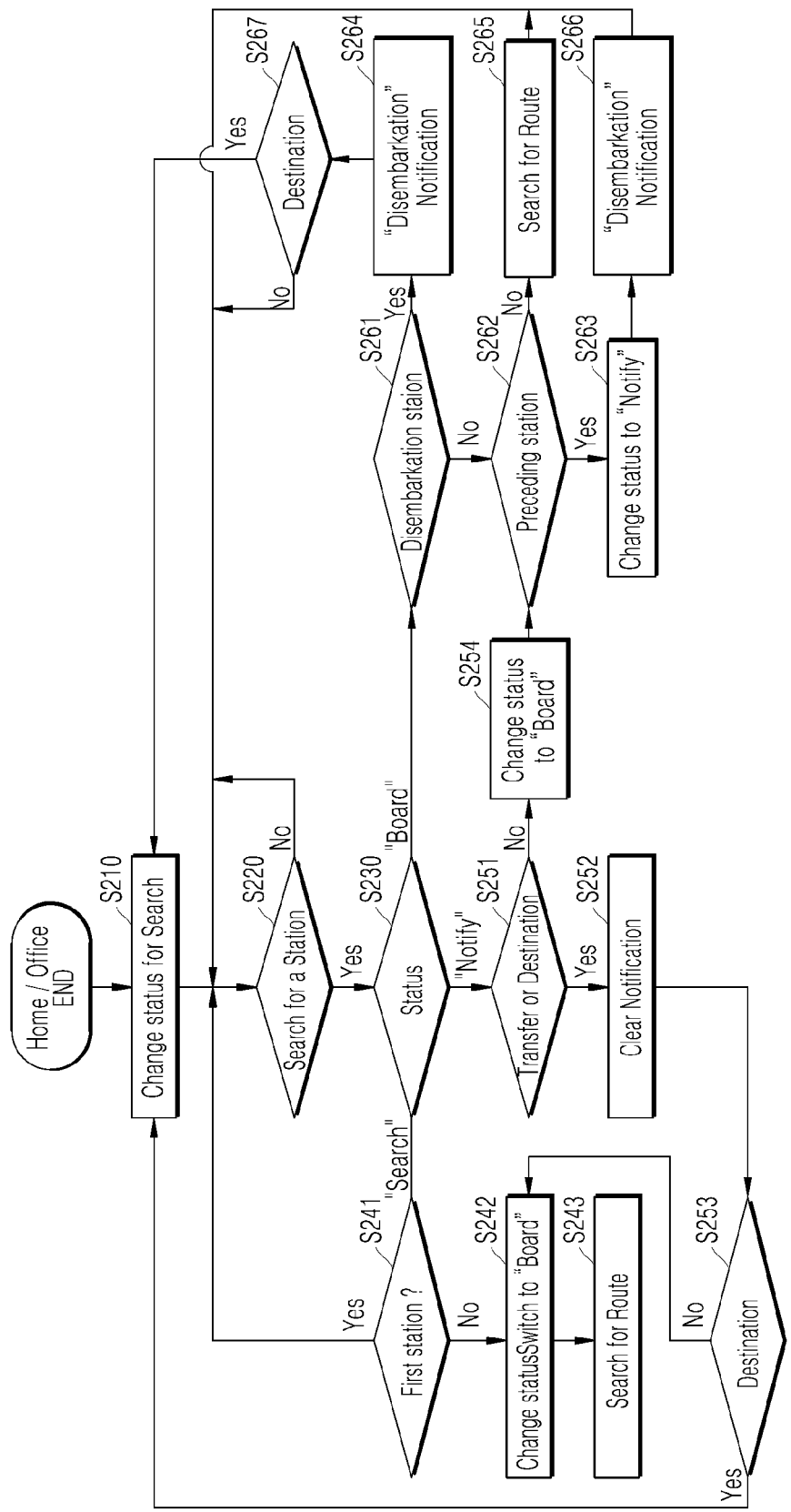
FIG. 11 is a flowchart illustrating a recognition method according to an embodiment of the present disclosure.

FIG. 11 is a flowchart illustrating a recognition method according to an embodiment of the present disclosure.

FIG. 11 is a flowchart illustrating an algorithm for notifying the user of the disembarkation time using a method for indicating one status selected from among plural statuses "Search", "Notify", and "Board" as status information of the user equipment (UE) 100. Status information of the user equipment (UE) 100 having exited a home or office of the user may be changed to "Search" status (S210). In this case, the user equipment (UE) 100 may switch to a Wi-Fi scanning mode to collect Wi-Fi information. Subsequently, the user equipment (UE) 100 performs station recognition and detects a name of the recognized station (S220). The status information of the user equipment (UE) 100 may correspond to any one of three statuses, i.e. "Search" status, "Notify" status, and "Board" status needed for such recognition. The search status "Search" may include a plurality of steps S241 to S243. The notification status "Notify" may include a plurality of steps S261 to S266 notifying the user of the disembarkation time. After the user equipment (UE) 100 notifies the user of the disembarkation time, a process of cancelling such notification (i.e. alert clearing) may be carried out (S252).

Figure 12:
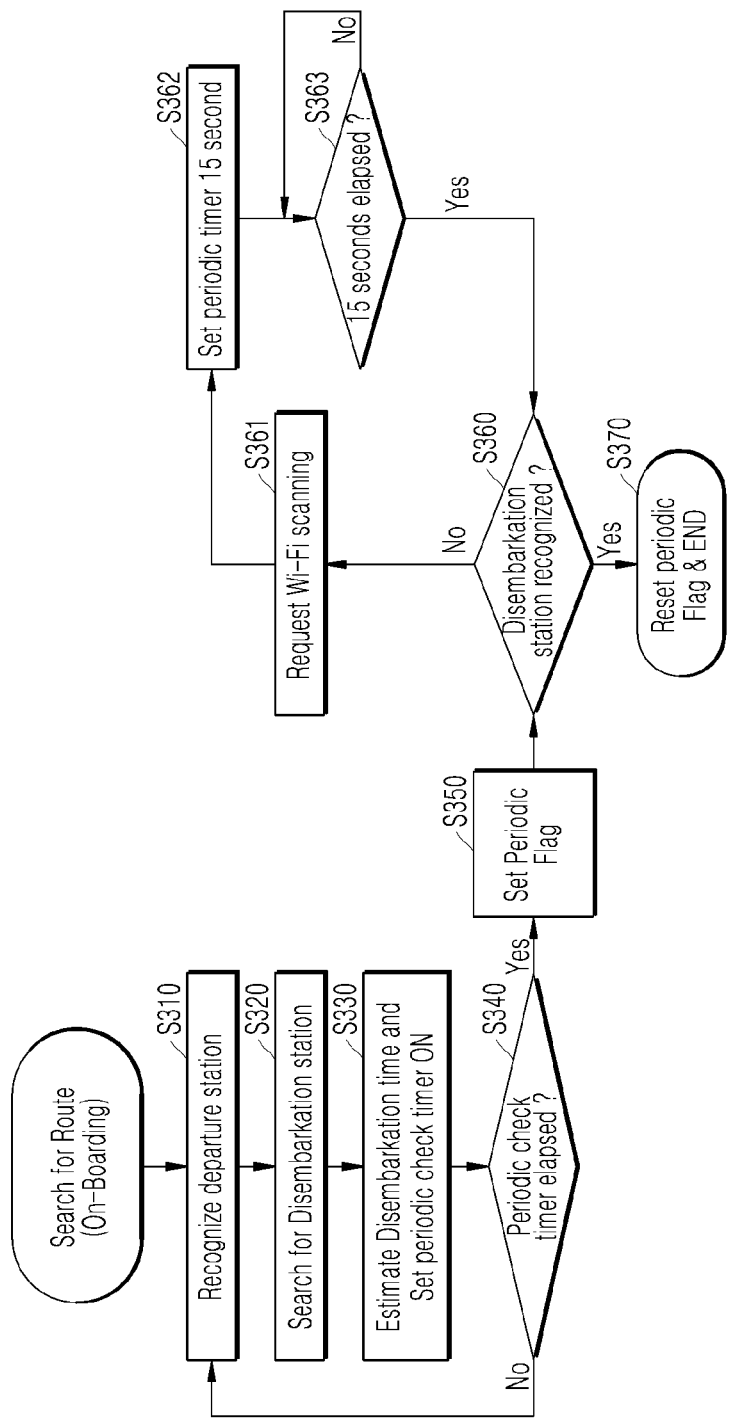
FIG. 12 is a flowchart illustrating a method for recognizing whether a user enters a passenger car according to an embodiment of the present disclosure.

FIG. 12 is a flowchart illustrating a method for recognizing whether the user has entered the passenger car according to an embodiment of the present disclosure.

Referring to FIG. 12, a departure station is recognized (S310), and a disembarkation station is then detected (S320). In order to estimate a user's entry time to a preceding station located just before the disembarkation station, the timer starts operation (S330). If the timer has expired at a specific time (S340), a periodic flag is set to the specific time (S350). In steps S360 to S363, the user equipment (UE) 100 may recognize the disembarkation station through Wi-Fi scanning. If the disembarkation station is recognized (S360), the set periodic flag may be initialized, and the boarding step from the departure station to a subsequent disembarkation station of the above disembarkation station is ended (S370). In this case, the Wi-Fi scanning time may be set to 15 seconds (S362).

Figure 13:
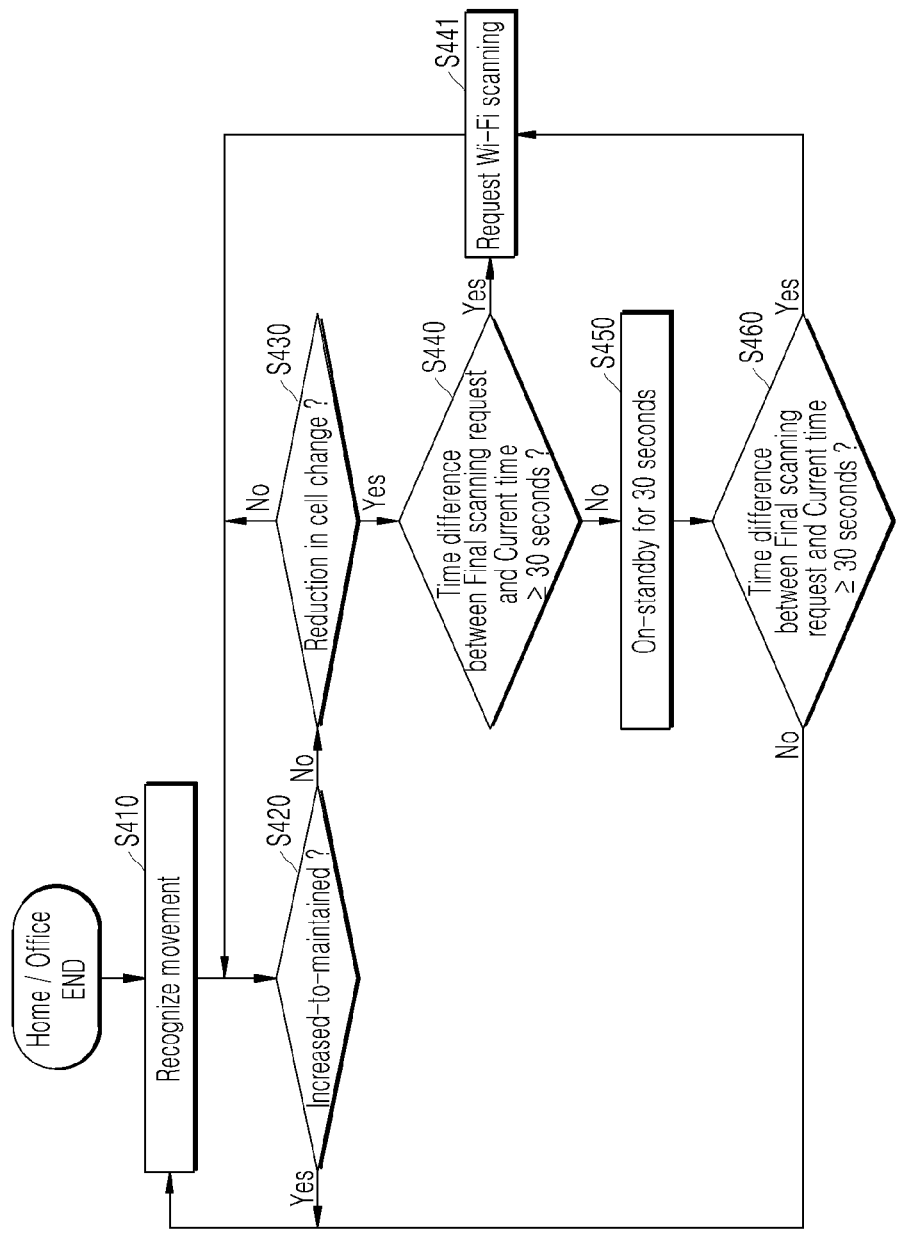
FIG. 13 is a flowchart illustrating a method for verifying a route based on a change in cell according to an embodiment of the present disclosure.

FIG. 13 is a flowchart illustrating a method for verifying a route based on change in cells according to an embodiment of the present disclosure.

When the passenger car is moving from one station to another station, a first section in which the amount of cell change per minute is increased, a second section in which the amount of cell change per minute is maintained, and a third section in which the amount of cell change per minute is reduced, may be generated.

Referring to FIG. 13, after expiration of the first section in which the amount of cell change per minute is increased and the second section in which the amount of cell change per minute is maintained (S340), the third section (S430) in which the amount of cell change per minute is reduced may be activated. The user equipment (UE) 100 compares a current time with the final scanning request time. In this case, if it is determined that the difference between the last scanning request time and the current time is 30 seconds or longer, the user equipment (UE) 100 may request scanning again (S441).

Figure 14:
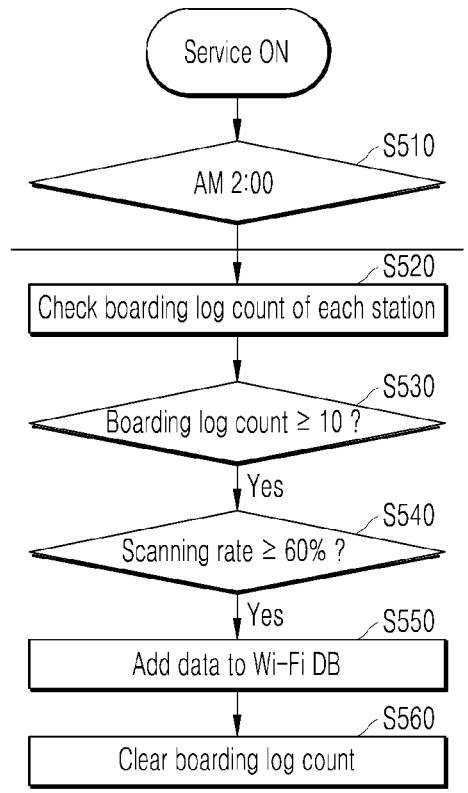
FIG. 14 is a flowchart illustrating On-Device learning according to an embodiment of the present disclosure.

FIG. 14 is a flowchart illustrating an On-Device learning scheme according to an embodiment of the present disclosure.

FIG. 14 illustrates an exemplary algorithm for adding new Wi-Fi data to a Wi-Fi database (DB) at 2:00 A.M. As shown in FIG. 14, if a boarding log count (i.e. a boarding record indicating the number of boarding times) is equal to or greater than 10 times (S530), and if the scanning rate is equal to or greater than 60% (S540), the user equipment (UE) 100 may perform Wi-Fi database (DB) maintenance using Wi-Fi information pre-collected in subway stations.

Specifically, the user equipment (UE) 100 may recognize entry stations by matching the Wi-Fi database with active and passive Wi-Fi scanning results. The user equipment (UE) 100 may encrypt and store the Wi-Fi scanning results used to recognize a specific station. In an idle time zone in which there is no user input to the user equipment (UE) 100, for example, at 2:00 A.M., the user equipment (UE) 100 may use an alarm setting function to search for a subway station having at least 10 scanning results in a plurality of subway stations each having at least one scanning result. If a new Wi-Fi AP, the scanning rate of which is equal to or higher than a specific level (e.g. 60%), is searched for by the user equipment (UE) 100, the user equipment (UE) 100 may add the new Wi-Fi AP to the Wi-Fi database (DB). Next, the user equipment (UE) 100 may delete a total of 10 scanning results, and may initialize the result of scanning to zero "0".

Figure 15:
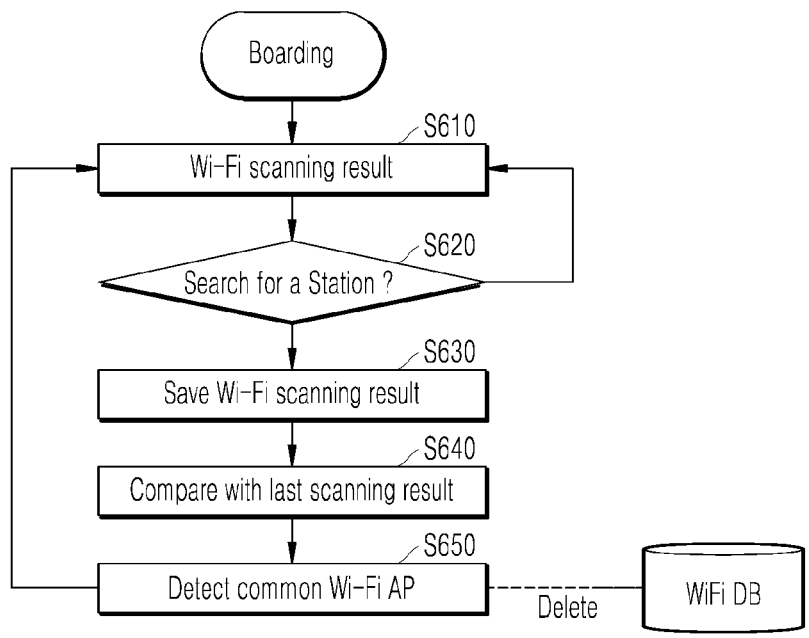
FIG. 15 is a flowchart illustrating On-Device learning according to an embodiment of the present disclosure.

FIG. 15 is a flowchart illustrating On-Device learning according to an embodiment of the present disclosure.

In the On-Device learning algorithm of FIG. 15, first communication connectivity information collected in the subway station is compared with second communication connectivity information (e.g. Wi-Fi scanning information) information collected in the passenger car, and the second communication is then deleted from the first communication connectivity information. Through such database personalization processing, an unexpected situation in which, although the passenger car carrying the user of the user equipment (UE) 100 is moving in the subway map, the same subway stations are continuously recognized by the user equipment (UE) 100, can be prevented from occurring.

Figure 16:
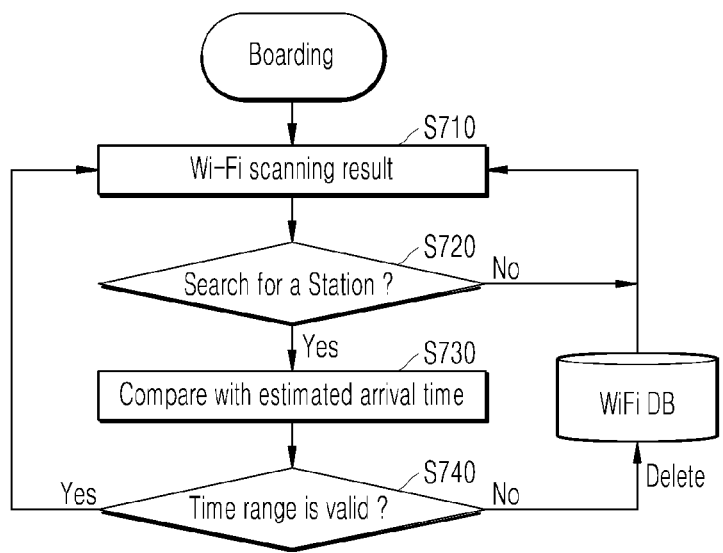
FIG. 16 is a flowchart illustrating On-Device learning according to an embodiment of the present disclosure.

FIG. 16 is a flowchart illustrating On-Device learning according to an embodiment of the present disclosure.

In the On-Device learning algorithm of FIG. 16, an invalid Wi-Fi database (DB) is detected based on the shortest movement time from one station to another station, and the detected invalid Wi-Fi database (DB) is then automatically deleted.

The user equipment (UE) 100 having entered the passenger car at a current station may recognize the current station. In this case, the user equipment (UE) 10 may further store a station recognition time (i.e. an arrival time at the current station) at which the current station is recognized (S720). The user equipment (UE) 100 may calculate an estimated arrival time not only using an arrival time measured at a preceding station of the current station, but also using the shortest movement time between two stations (i.e. the current station and the preceding station).

Next, the user equipment (UE) 100 may compare a measured arrival time with the estimated arrival time (S730). The user equipment (UE) 100 may determine whether the range of the measured arrival time is between a minimum value and a maximum value of the estimated arrival time (S740).

Subsequently, if the measured arrival time is located outside the estimated arrival time, the user equipment (UE) 100 may determine that the current station has been incorrectly recognized, such that the user equipment (UE) 100 may delete the AP information of the current station from the AP database (DB) (S750). Next, the user equipment (UE) 100 may repeatedly execute steps S710 to S750.

Figure 17:
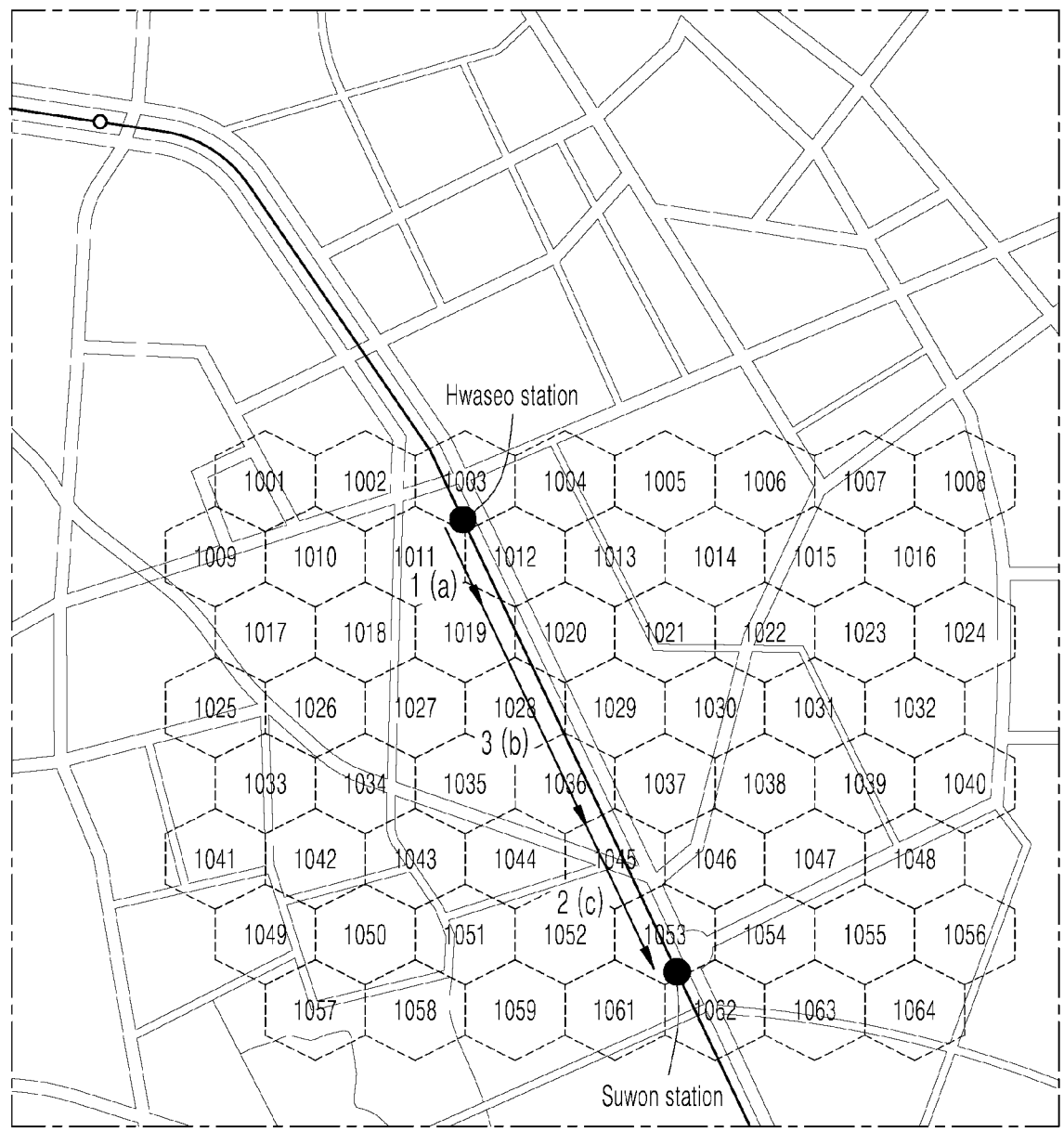
FIG. 17 is a conceptual diagram illustrating a change in cell according to an embodiment of the present disclosure.

FIG. 17 is a conceptual diagram illustrating a change in cells according to an embodiment of the present disclosure.

FIG. 17 is a conceptual diagram illustrating an exemplary distribution of a plurality of cells between Hwaseo station and Suwon station of Subway Line 1. In mobile communication, the term "cell" may refer to a concept for divisionally managing a coverage region to which the user equipment (UE) 100 belongs, so as to allow the user equipment (UE) 100 to be kept in a call waiting mode, such that the coverage region is divided into a plurality of sub-regions and is controlled in different ways according to the divided sub-regions. The user equipment (UE) 100 serving as a mobile communication terminal, which has already boarded the passenger car, moves by subway, and there arises a difference in the amount of cell change per minute associated with UE handover according to a driving speed of the passenger car. That is, the amount of cell change per minute may gradually increase in an initial stage (i.e. a departure stage) of driving the passenger car, and may be maintained relatively constant in an intermediate stage of passenger car driving. Thereafter, if the passenger car closely approaches a subsequent station, the amount of cell changer per minute may gradually decrease. Referring to FIG. 17, the amount of cell change per minute in the initial stage of the passenger car driving may be denoted by "$1(a)$", the amount of cell change per minute in the intermediate stage of the passenger car driving may be denoted by "$3(b)$", and the amount of cell change per minute in the last stage of the passenger car driving may be denoted by "$3(b)$".

Figure 18:
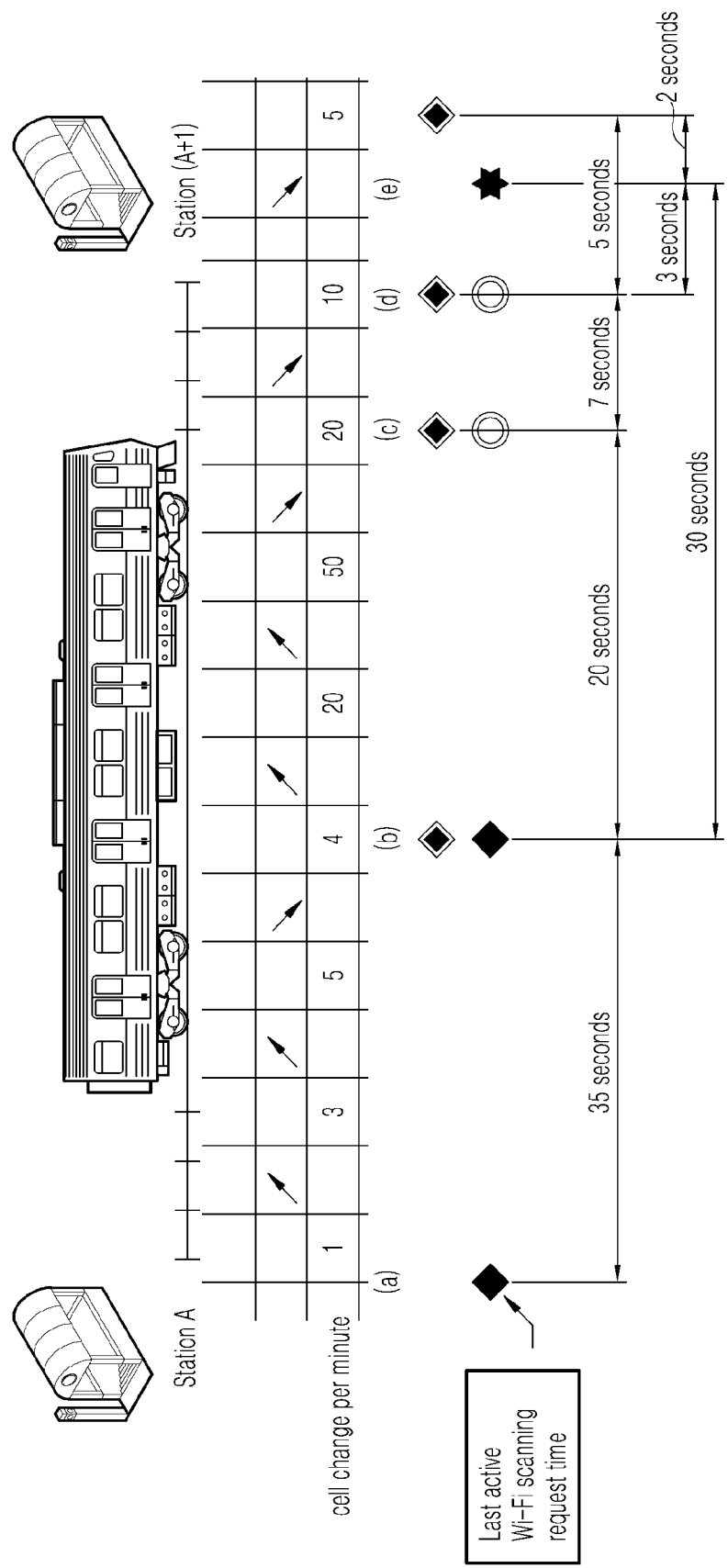
FIG. 18 is a conceptual diagram illustrating information about a cell change per minute, that is collected in a passenger car that begins to move from a stationary mode at a departure station and then arrives at the next station.

FIG. 18 is a conceptual diagram illustrating information about a cell change per minute, which is collected in the passenger car that begins to move from a stationary mode at a departure station and then arrives at the next station.

The user equipment (UE) 100 may estimate a deceleration section using the amount of cell change per minute. The user equipment (UE) 100 may enter a preliminary stage to collect communication connectivity information in the estimated deceleration section. If entry to the station is detected, the user equipment (UE) 100 may collect communication connectivity information.

Referring to FIG. 18, the amount of cell change per minute measured in a section from one station "Station A" (i.e. a destination station) to another station "Station A+1" (i.e. a destination station) may gradually increase in the order of 1→3→5, and may then decrease in the order of 20→20→5. In this case, in each of the deceleration sections, i.e. (b), (c), (d), and (e), in which the amount of cell change per minute is reduced, the user equipment (UE) 100 may request active Wi-Fi scanning. However, if a cycle of previous Wi-Fi scanning is 30 seconds or less, or if information of passive Wi-Fi scanning information has already been collected, the user equipment (UE) 100 may skip over the active Wi-Fi scanning. Through steps of FIG. 18, the user equipment (UE) 100 may recognize a deceleration section in which the passenger car closely approaches the station (Station A+1), and may collect more reliable communication connectivity information about the station (Station A+1).

As is apparent from the above description, according to the embodiments of the present disclosure, a user who desires to recognize an arrival time at a necessary station need not directly input names of a departure station and a destination station one by one to a user equipment (UE), resulting in increased user convenience.

The embodiments of the present disclosure may allow the user equipment (UE) to autonomously notify the user of information about arrival at a transfer station and/or a destination station without using a subway location system or public transportation control servers.

The embodiments of the present disclosure may allow the user who holds the user equipment (UE) to pre-recognize a disembarkation time, and may collect communication connectivity information only within a region covered by a preceding station located just before a target station where the user has to alight, resulting in reduction in power consumption.

The embodiments of the present disclosure may pre-notify a user of disembarkation time information at a transfer station and a destination station on a subway route.

The embodiments of the present disclosure may perform activity recognition (AR) without depending on communication connectivity information only, resulting in increased reliability in activity recognition (AR).

In order to adaptively cope with variable user intentions, the embodiments of the present disclosure may autonomously perform route verification, and may receive route confirmation information from the user.

The embodiments of the present disclosure may more reliably calculate an estimated departure time needed to calculate an estimated disembarkation time.

What is claimed is:

1. A method by a user equipment (UE) for a user moving from a departure station to a destination station along a route, the method comprising:
identifying information of the departure station using first communication connectivity information obtained at the departure station and information from a station pool;
identifying information of the destination station based on remaining stations, other than the departure station, from among a plurality of user-preferred stations pre-registered in the station pool;
obtaining second communication connectivity information at a preceding disembarkation station that is located before a disembarkation station, wherein the disembarkation station is identified based on the information of the destination station;
identifying entry by the UE to the preceding disembarkation station based on the second communication connectivity information; and
providing a notification for the user of a disembarkation time, of either a transfer station or the destination station, based on a time of the entry by the UE to the preceding disembarkation station.

2. The method of claim 1, wherein the route is a subway route or a transportation route.

3. The method of claim 1, wherein the information of the departure station includes a departure-station entry time at which entry by the UE to the departure station occurs, and a name of the departure station.

4. The method of claim 1, wherein the information of the destination station includes a name of the destination station, the route between the departure station and the destination station, and a name of the disembarkation station.

5. The method of claim 1, wherein the identifying of the entry by the UE to the preceding disembarkation station includes:
estimating a time of the entry by the UE to the preceding disembarkation station;
prior to reaching the estimated entry time to the preceding disembarkation station, obtaining additional communication connectivity information; and
identifying the entry by the UE to the preceding disembarkation station using the additional communication connectivity information.

6. The method of claim 5, wherein:
the time of the entry by the UE to the preceding disembarkation station is based on a first recognition time at which the UE has entered the departure station; or
the estimated the time of the entry by the UE to the preceding disembarkation station is based on a second recognition time at which the UE has entered a passenger car at the departure station.

7. The method of claim 1, further comprising:
recognizing the UE as having entered the departure station, and recognizing the UE as having entered a passenger car at the departure station, both using at least one of sensing information of the UE or the first communication connectivity information.

8. The method of claim 7, wherein the recognizing the UE as having entered the departure station includes:
recognizing at least one activity comprising a walking activity, a quick-walking activity, a running activity, an in-elevator activity, or an on-escalator activity, each of which is recognized based on at least one movement of the UE; and
performing the recognizing the UE as having entered the departure station based on the recognizing of the at least one activity.

9. The method of claim 1, further comprising:
performing a function of mandatorily collecting communication connectivity information in at least one transit station along the route; and
verifying the route from the departure station to the destination station using the mandatorily collected communication connectivity information.

10. The method of claim 9, further comprising:
prior to entering the at least one transit station, detecting a deceleration section of a passenger car based on information of cell change per unit time of the UE; and
performing the function of the mandatorily collecting the communication connectivity information based on the detected deceleration section.

11. The method of claim 1, further comprising:
displaying an identifier of the disembarkation station based on the information of the destination station; and
performing a request for the user to confirm the displayed identifier of the disembarkation station.

12. The method of claim 1, wherein:
the station pool includes either information obtained by user input or information obtained by machine learning of the UE; and
the disembarkation station is identified by at least one UE movement pattern learned by the machine learning.

13. A user equipment (UE), comprising:
a wireless communication device configured to access a wireless communication network; and
a processor configured to:
identify information of a departure station using first communication connectivity information collected at the departure station and information from a station pool, wherein the departure station is along a route that includes a destination station;
identify information of the destination station based on remaining stations, other than the departure station, from among a plurality of user-preferred stations pre-registered in the station pool;
obtain second communication connectivity information at a preceding disembarkation station that is located before a disembarkation station, wherein the disembarkation station is identified based on the information of the destination station;
identify entry by the UE to the preceding disembarkation station based on the second communication connectivity information; and
provide a notification for a user of the UE of a disembarkation time, of either a transfer station or the destination station, based on a time of the entry by the UE to the preceding disembarkation station.

14. The UE of claim 13, further comprising:
a memory configured to store the first communication connectivity information, wherein the processor is further configured to:
utilize a database (DB) that includes the first communication connectivity information to identify the departure station; and
store, in the memory, personalized communication connectivity information acquired by On-Device learning of the UE.

15. The UE of claim 13, further comprising:

at least one sensor configured to detect at least one movement of the UE, wherein the processor is further configured to:

recognize at least one activity comprising a walking activity, a quick-walking activity, a running activity, an in-elevator activity, or an on-escalator activity, each of which is recognized based on the least one movement of the UE; and recognize the UE as having entered the departure station, exiting the departure station, boarding a passenger car, or exiting from the passenger car.

16. The UE of claim 13, wherein the processor includes:

a first processor; and a second processor configured to:

operate in a low-power domain;

estimate an entry time of the UE to the preceding disembarkation station; and perform a function of mandatorily collecting communication connectivity information prior to entering the preceding disembarkation station, and wherein the first processor is configured to recognize the entry of the UE to the preceding disembarkation station using the collected communication connectivity information.

17. The UE of claim 13, wherein the processor includes:

a first processor; and a second processor configured to:

operate in a low-power domain;

perform a function of mandatorily collecting communication connectivity information to collect information of at least one transit station, and wherein the first processor is configured to verify the route from the departure station to the destination station using the communication connectivity information collected at the at least one transit station.

18. The UE of claim 13, wherein the route is a subway route or a transportation route.

* * * * *